Nov. 26, 1957    J. V. WERME ET AL    2,814,731
MEASURING APPARATUS
Original Filed Dec. 1, 1953    5 Sheets-Sheet 1
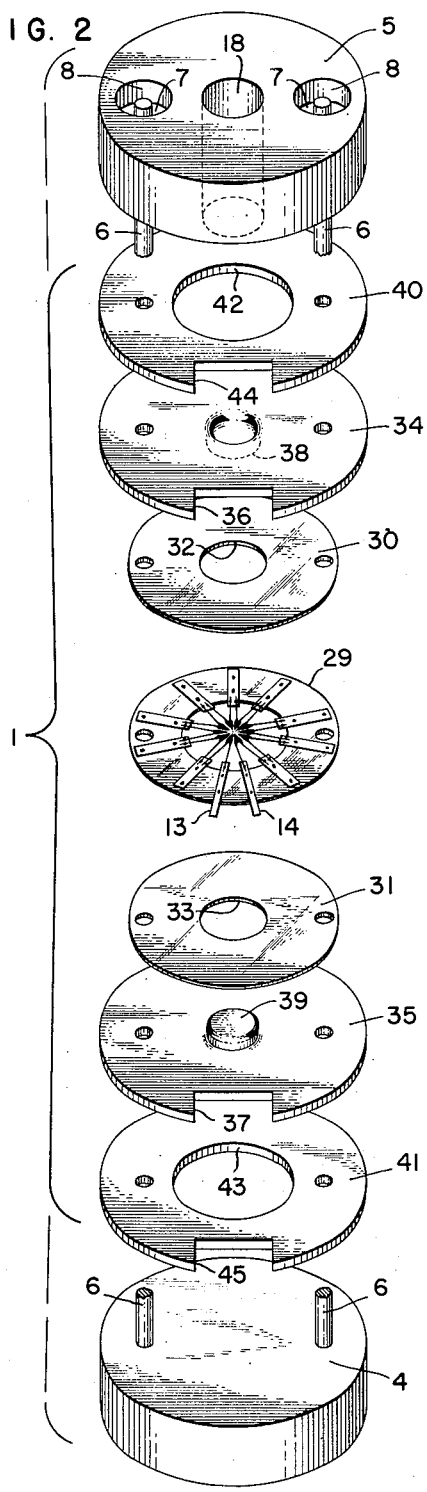
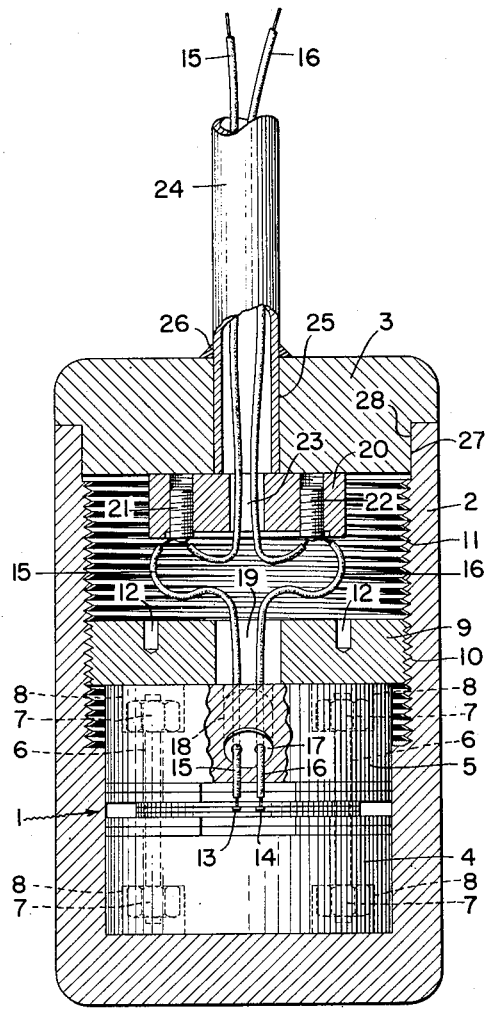
INVENTORS.
JOHN V. WERME
JOHN A. DEVER
BY  JOHN A. DUKE
ATTORNEY.

Nov. 26, 1957   J. V. WERME ET AL   2,814,731
MEASURING APPARATUS

Original Filed Dec. 1, 1953   5 Sheets-Sheet 2

INVENTORS.
JOHN V. WERME
JOHN A. DEVER
BY   JOHN A. DUKE

Arthur H. Swanson
ATTORNEY.

Nov. 26, 1957 J. V. WERME ET AL 2,814,731
MEASURING APPARATUS
Original Filed Dec. 1, 1953 5 Sheets-Sheet 3

INVENTORS.
JOHN V. WERME
JOHN A. DEVER
BY JOHN A. DUKE

ATTORNEY.

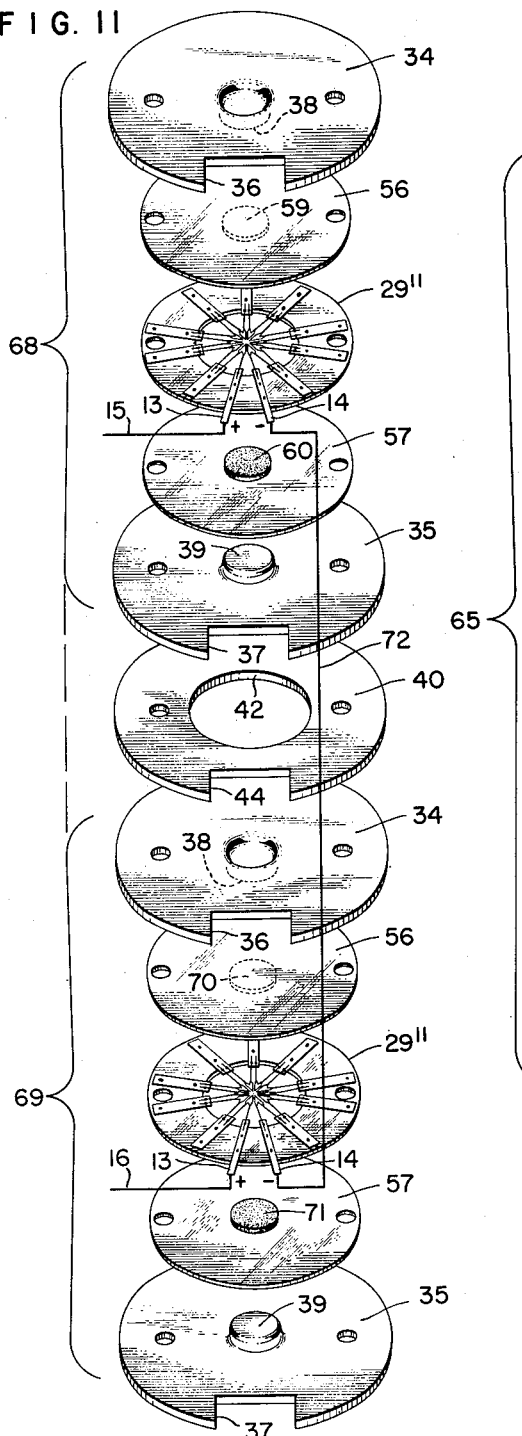
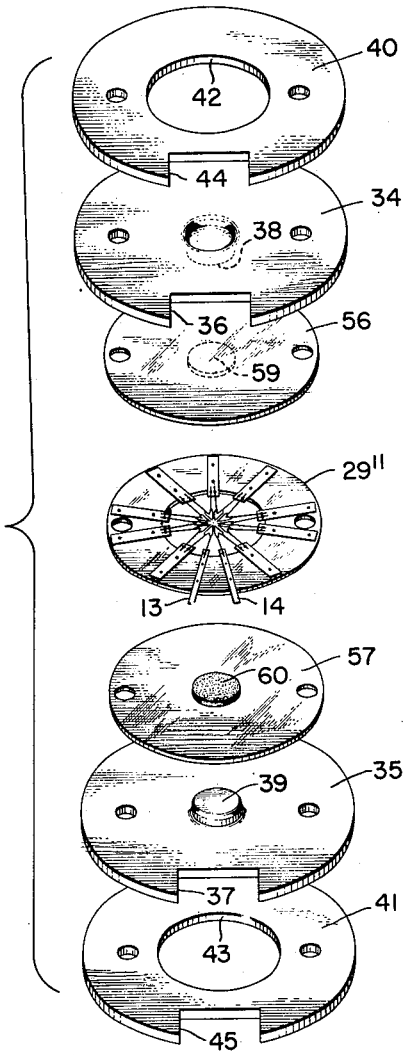

Nov. 26, 1957  J. V. WERME ET AL  2,814,731
MEASURING APPARATUS
Original Filed Dec. 1, 1953  5 Sheets-Sheet 5

INVENTORS.
JOHN V. WERME
JOHN A. DEVER
BY JOHN A. DUKE

Arthur N. Swanson
ATTORNEY.

United States Patent Office 2,814,731
Patented Nov. 26, 1957

2,814,731

MEASURING APPARATUS

John V. Werme, Fort Washington, John A. Dever, Gladwyne, and John A. Duke, Philadelphia, Pa., assignors to Minneapolis-Honeywell Regulator Company, Minneapolis, Minn., a corporation of Delaware Continuation of application Serial No. 395,348, December 1, 1953. This application September 20, 1954, Serial No. 457,266

24 Claims. (Cl. 250—83.1)

The present invention relates generally to neutron flux measuring apparatus of the type wherein the neutron flux generates heat which is measured by electrical means, and relates specifically to an improved neutron detector of the foregoing type having operating characteristics which are superior to those of previously known neutron detectors and which cause the present detector to be especially well adapted for use in the measurement of neutron flux in connection with the operation and control of neutronic reactors.

This application is a continuation of our copending application, Serial No. 395,348, which was filed on December 1, 1953, and now abandoned.

The general object of the present invention is to provide a novel neutron detector of the type stated above which is especially well suited for use in the measurement of neutron flux in connection with the operation and control of neutronic reactors, and which is operative in an improved manner and with readily preselectable sensitivity and response speed characteristics to provide an electrical output signal of a magnitude representative of the neutron flux to which the detector is exposed.

A specific object of the invention is to provide a novel neutron detector of the type just set forth wherein a neutron sensitive portion capable of generating heat in the presence of neutrons is arranged in good heat transfer relationship with thermal sink structure by means of a solid thermal connection of relatively good thermal conductance which is located between the neutron sensitive portion and the sink structure, and wherein a differential temperature responsive device, having temperature responsive elements thermally coupled to the portion and the structure, is caused to respond to changes in the incident neutron flux with sensitivity and response speed characteristics which are dependent upon the magnitude of the thermal conductance of the said thermal connection.

A more specific object of the invention is to provide a novel neutron detector of the type just specified wherein the temperature responsive device is of the thermoelectric type having at least one hot junction arranged in good heat transfer relationship with the neutron sensitive portion, and having at least one cold junction arranged in good heat transfer relationship with the thermal sink structure, and wherein the aforementioned thermal connection is independent of the temperature responsive device.

An even more specific object of the invention is to provide a thermoelectric type of neutron detector as just described including a thermopile having cold junctions which are arranged in good heat transfer relationship with the thermal sink structure and having hot junctions which are disposed closely together in a circular configuration, and wherein the neutron sensitive portion is located between, and is arranged in good heat transfer relationship with, the hot junction configuration and the thermal sink structure.

A still more specific object of the invention is to provide a neutron detector as just specified wherein the neutron sensitive portion consists of a coating of a neutron sensitive material carried by the thermopile hot junctions, and wherein a portion of the sink structure is held in solid thermal contact with the neutron sensitive coating independently of the thermopile to provide the aforementioned solid thermal connection between the neutron sensitive portion and the sink structure.

Another more specific object of the invention is to provide a neutron detector of the general type previously specified which is similar to the detector just described but wherein the neutron sensitive portion is in the form of at least one disk of a neutron sensitive material which is supported in solid thermal contact with the sink structure independently of the thermopile to provide the aforementioned solid thermal connection between the neutron sensitive portion and the sink structure, and which is held in good heat transfer relationship with the thermopile hot junctions.

A further specific object of the invention is to provide a novel method of arranging and supporting the neutron sensitive disk or disks in solid thermal contact with their supporting means in a neutron detector of the type last specified.

Another specific object of the invention is to provide a novel neutron detector wherein a plurality of neutron sensitive thermopiles are so relatively arranged in a novel manner as to cause the detector to have a desirably high sensitivity to neutron flux, and at the same time to have a desirably high speed of response to changes in the flux.

Still another specific object of the invention is to provide a novel thermoelectric type of neutron detector as described above including means to render the detector output substantially free from the effects of changes in the ambient temperature.

An additional specific object of the invention is to provide a novel neutron detector of the general type hereinbefore specified including means by which the thermal conductance between the neutron sensitive portion and the sink structure can be readily varied so as to vary the sensitivity and speed of response of the detector.

In the operation of a neutronic reactor, the accurate measurement of the neutron radiation intensity or neutron flux is vital to successful reactor operation. The reason for this is that the power being developed in such a reactor at any particular instant is generally proportional to the neutron flux existing within the reactor at that instant. The measurement of neutron flux in a neutronic reactor thus constitutes an important tool for the monitoring and controlling of the reactor operation, since the neutron flux measurements obtained yield important and significant information as to the reactions proceeding within the reactor, and hence provide a convenient and effective basis for the controlling actions applied to the reactor to maintain the proper operation thereof.

As will be apparent from the foregoing, the successful operation of a neutronic reactor in accordance with the procedure just described requires the presence and operation of a neutron flux measuring device or neutron detector which will provide an output signal of a magnitude dependent upon the instantaneous value of the neutron flux to which the detector is exposed within the reactor. Although various of the previously known types and forms of neutron detectors have been applied in the past for the measurement of neutron flux in the foregoing application, experience has shown that these known neutron detectors are not always entirely suitable or satisfactory for this purpose.

In this connection, it is noted that the previously known neutron detectors consist, for the most part, of counters and ion chambers, and that the detectors of each of these types have several characteristics which in some cases prevent them from being suitable for the purpose set forth above. For example, both counters and ion chambers require a high voltage power supply and relatively good insulation, and are frequently fragile. Moreover, their signal outputs are usually at high impedance, thus giving rise to the known difficulties of making measurements under such a condition. Further, counters are usually delicate and usually require that their outputs be amplified electronically, while ion chambers are usually large, and may take up excessive valuable space in the reactors. Also, ion chambers are frequently expensive and difficult to manufacture.

A third type of neutron detector which has been suggested in the past is the thermoelectric type. However, in the form in which it has previously been known in the art, the thermoelectric neutron detector, consisting of a thermopile with neutron sensitive elements, has not solved the problem of providing a detector which is entirely suitable for use in reactor applications. For example, the previously known forms of thermoelectric neutron detectors do not exhibit satisfactory response speed characteristics for reactor applications under certain operating conditions.

Each of the various other types of known neutron detectors, such, for example, as the known type employing a luminescent or fluorescent screen and a cooperating photoelectric cell, also has been found to have one or more undesirable characteristics which prevents that type of detector from being generally suitable for reactor measurement applications.

Accordingly, it is the primary specific object of the present invention to provide a novel neutron detector of the thermoelectric type which is not characterized by the undesirable features of the above previously known types of neutron detectors as discussed above, which does not exhibit the shortcomings of these previous types of detectors when employed for reactor monitoring and controlling purposes, and which is not subject to the less than satisfactory operation obtained when the previously known detectors are employed in reactor applications.

To this end, the novel neutron detector of the present invention is characterized by having highly desirable sensitivity and speed of response characteristics, by having the advantageous characteristics of simple and rugged construction, small size, and highly satisfactory, reliable operation with a readily usable and measurable output signal, and by being capable of being readily manufactured and reproduced in a practical manner. These desirable characteristics of the novel detector of the present invention, together with the other desirable characteristics thereof which will become apparent from the following description of the invention, render this detector well adapted for use in the measurement of neutron flux in reactor applications, in which applications this detector is effective to provide a highly advantageous type of consistent and reliable operation not obtainable with the various neutron detectors previously known in the art.

The above-stated objects of the present invention are fulfilled in each of the preferred embodiments thereof by the provision therein of a neutron sensitive portion which is composed at least in part of a material characterized by a relatively good neutron capturing ability. This neutron sensitive material is thus operative, when subjected to neutron radiation, to generate heat in the said portion at a rate which is dependent upon the magnitude of the incident neutron flux.

In order to measure this rate of heat generation, for the purpose of obtaining a measure of the incident neutron flux, each of the embodiments of the invention includes thermal sink structure which is characterized by an ability to carry off heat at a relatively high rate, a thermal or heat conducting connection of relatively good thermal conductance located between the neutron sensitive portion and the sink structure and maintaining these two parts in good heat transfer relationship independently of the other parts of the apparatus, and a differential temperature responsive device having elements in good heat transfer relationship with the neutron sensitive portion and the sink structure.

In operation, the generation of heat in the neutron sensitive portion by the incident neutron radiation causes heat to flow over said thermal connection from the portion to the structure at a rate which is dependent upon the rate at which the heat generation takes place. This heat flow in turn produces between the portion and the structure a temperature difference or drop of a magnitude which is dependent upon the rate of the heat flow and the thermal conductance of said thermal connection. This temperature difference is measured by the temperature responsive device, and the latter provides an electrical effect which is dependent upon the difference between the temperatures of the portion and the structure, and hence upon the magnitude of the incident neutron flux.

In each of the preferred embodiments of the invention, the aforementioned thermal sink structure is formed at least in part by the housing structure of the apparatus, and is advantageously formed of a material which has good thermal conduction characteristics to provide substantial equality of temperature throughout the structure. Moreover, this material is characterized by a relatively poor neutron capturing ability. Also, in each embodiment, the differential temperature responsive device is advantageously a thermopile of known circular form having its hot junctions arranged in good heat transfer relationship with the neutron sensitive portion, and having its cold junctions arranged in good heat transfer relationship with the aforementioned structure, whereby the thermopile produces an output E. M. F. which is dependent upon the magnitude of the incident neutron flux.

In one embodiment of the invention, the neutron sensitive portion is in the form of a coating of neutron sensitive material for the thermopile hot junctions, and the aforementioned thermal connection is provided by arranging a portion of the sink structure in solid thermal contact with the neutron sensitive coating independently of the thermopile. In another embodiment, the neutron sensitive portion is in the form of a disk of the neutron sensitive material, and the aforementioned thermal connection independent of the thermopile is provided by arranging a portion of the apparatus to support the disk in solid thermal contact with the sink structure, this portion also serving to hold the disk in good heat transfer relationship with the thermopile hot junctions.

Other characteristics and features of the foregoing and other embodiments of the present invention will become apparent upon a consideration of the detailed description of the invention which follows. It is noted briefly here, however, that, in each embodiment of the invention, the magnitude of the thermal conductance of the aforementioned thermal connection determines both the sensitivity and response speed characteristics of the apparatus. Therefore, a detector according to the present invention can be constructed to have preselected, desirable sensitivity and response speed characteristics by making the said thermal connection within the detector to have the specific thermal conductance characteristics required to give the particular sensitivity and response speed characteristics which are desired. The provision of the said thermal connection with its selectable thermal conductance in the apparatus of the invention thus results in the fulfillment of the above stated object of the invention to provide a novel neutron detector having improved and highly desirable operation which is characterized by preselectable or predeterminable sensitivity and response speed characteristics.

The various features of novelty which characterize our invention are pointed out with particularity in the claims annexed to and forming a part of this specification. For a better understanding of the invention, however, its advantages and specific objects obtained with its use, reference should be had to the accompanying drawings and descriptive matter in which we have illustrated and described preferred embodiments of the invention.

Of the drawings:

Fig. 1 is a view, shown partly in section, of a preferred form of the neutron detector of the present invention;

Fig. 2 is an exploded view of one form for the detecting portion of the detector of Fig. 1;

Fig. 8 is an exploded view of a modification of the detecting arrangement of Fig. 6;

Fig. 11 is an exploded view of a modification of the detecting arrangement of Fig. 8 which embodies a temperature compensation feature.

The apparatus of Fig. 1

Figure 3:
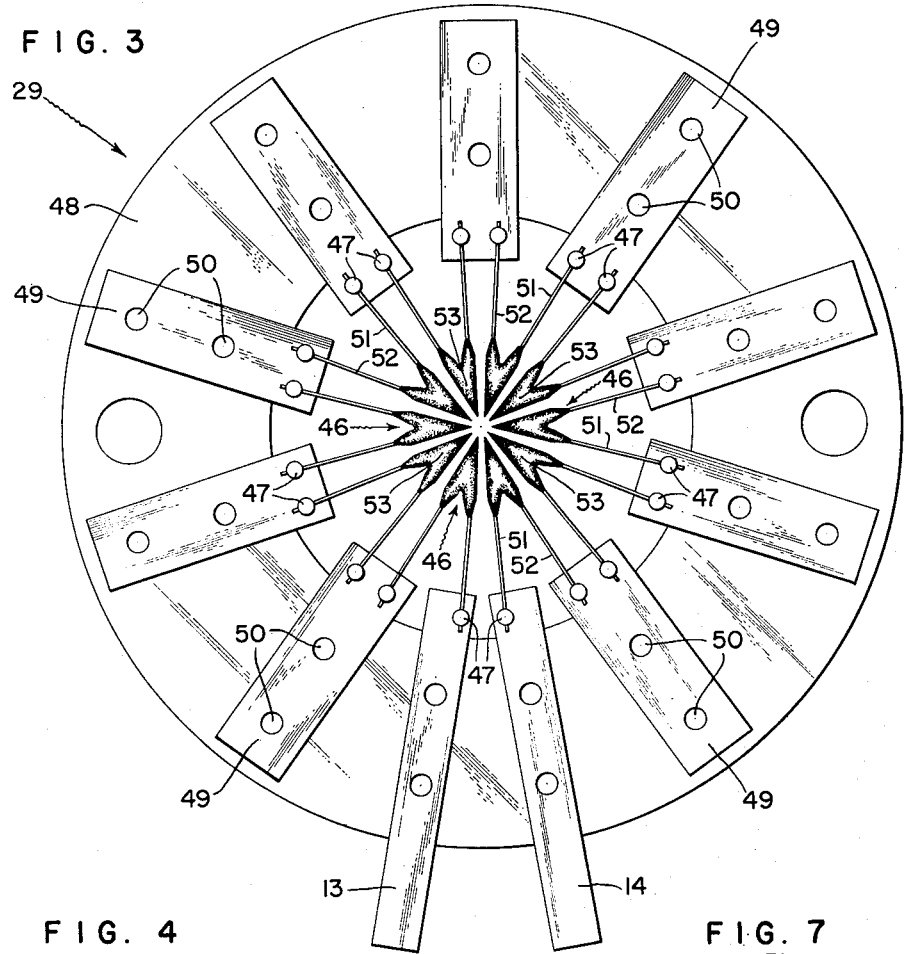
Fig. 3 is a view of one form of a thermopile element which may be used in the arrangement of Fig. 2.

The neutron flux responsive device or detector according to the present invention which we have illustrated by way of example in Fig. 1 is a device which is operative to produce an electrical output signal of a magnitude dependent upon the neutron flux to which the detector is subjected, and which is so constructed and arranged as to be especially well adapted for performing such neutron flux detection within a neutronic reactor or other similar location wherein an extremely rugged unit of small size and high response speed and sensitivity characteristics is required.

To the end of providing these and other desirable and/or necessary operating characteristics and features, the detector of Fig. 1 includes a neutron sensitive detecting portion which is indicated generally at 1 in the drawings, and which is contained and supported within a cylindrical housing structure 2. The latter is advantageously formed of a material, such as aluminum, which has good thermal conduction characteristics but which has a relatively poor neutron capturing ability. The housing 2 is closed at its lower end, as seen in Fig. 1, by an integral housing bottom member, and is closed at its top by a cap member 3. The latter is advantageously formed of the same material as that from which the housing 2 is formed. The purpose of employing a housing structure material having good thermal conduction characteristics is to provide substantial temperature equality throughout the structure, while the use of a housing structure material having a relatively poor neutron capturing ability prevents the housing from significantly shielding the enclosed detecting portion 1 from the incident neutron flux, and hence permits a maximum of the incident neutron flux to reach the enclosed detecting portion 1.

The detecting portion 1 is rigidly supported in a predetermined position within the housing 2 by being included in a tightly stacked assembly which in turn is securely held in the lower portion of the housing. To this end, the portion 1 is supported between a bottom end plate 4 and a top end plate 5, these three elements forming a stacked assembly which is securely held together by means of guide rods 6 and cooperating nuts 7. The rods 6 pass lengthwise through the stacked elements 1, 4, and 5, and have threaded ends which terminate within annular recesses 8 in the outer faces of the plates 4 and 5. The nuts 7 are threaded onto the threaded ends of the rods 6, and are drawn up tightly against the bottoms of the recesses 8 to hold the stacked elements tightly together as a unit.

The diameters of the portion 1 and the plates 4 and 5 are such as to cause the stacked assembly of these elements to be slideably received into the lower portion of the housing 2. This assembly is held securely in the last mentioned position by means of a plug member 9 having external threads 10 which engage corresponding threads 11 provided on the interior of the housing 2. By means of drive holes 12, properly located in the upper surface of the plug 9, and the threaded engagement between the housing 2 and the plug 9, the latter can be screwed down to maintain the assembly of the elements 1, 4, and 5 securely positioned in the desired position in the housing 2. The plates 4 and 5 and the plug 9 are advantageously made of a material, such as aluminum, having the same desirable characteristics as those described above for the housing and cap material.

The detecting portion 1 is equipped with electrical output terminals 13 and 14 which are connected to respective insulated leads 15 and 16 for the purpose of conducting the electrical output of the detector to the exterior of the housing. The leads 15 and 16 pass from the terminals 13 and 14 upwardly through a porcelain insulating bushing 17 located in a suitably inclined passage 18 in the top end plate 5, and then pass through an axial hole 19 in the plug 9 and into the space in the housing above the plug 9.

Within the last mentioned space is a terminal block 20 of insulating material which is rigidly mounted on the lower surface of the cap 3. The block 20 is provided with metallic terminal inserts 21 and 22 to which the leads 15 and 16 are electrically connected, as by soldering. The leads 15 and 16 within the space above the plug 9 are made sufficiently long to permit them to be soldered to the inserts 21 and 22 after the elements 1, 4, and 5 and the plug 9 have been properly positioned within the housing 2 and before the cap 3 is positioned thereon.

The leads 15 and 16 continue from their points of connection to the inserts 21 and 22 by passing upwardly through an axial hole 23 provided in the block 20, and then through a tube member 24 located in an axial passage 25 provided in the cap 3. The tube 24, which may be formed of aluminum, is advantageously sealed to the cap 3, as by soldering, as shown at 26. The leads 15 and 16 pass out of the housing through the tube 24 and thence may be electrically connected to the desired auxiliary equipment which is to be responsive to the electrical output produced by the detecting portion 1 of the device.

In order to protect the subject detector from the potentially deleterious environments in which such a detector is usually employed, it is necessary to seal the detector housing against such environments. To this end, the cap 3 is advantageously sealed to the housing 2. This may be done by assembling the cap to the housing by means of a shrink fit. One procedure by which such a fit may be effected will now be described by way of illustration and example, this procedure being one which has proved to be successful in practice.

According to the exemplary procedure now to be described for assembling the cap 3 to the housing 2 with a shrink fit, the inner surface 27 of the housing 2 above the internally threaded portion 11 is machined to give the housing 2 an internal diameter which is somewhat less than the external diameter of the lower, mating portion 28 of the cap 3. For example, the housing 2 may be made to have an internal diameter at the surface 27 of 1.250 inches, while the portion 28 of the cap 3 may be machined to a diameter of 1.257 inches. To assemble the cap to the housing, the latter is heated in a coil type heater to a temperature of the order of 450° F., while the cap is cooled to a temperature of approximately −50° F. by the use of Dry Ice. The two pieces are then brought squarely together. When both pieces have reached the same temperature, the cap 3 will be securely sealed to the housing 2.

It is to be understood that the procedure just described has been presented solely for purposes of illustration and example, and that the cap 3 may be sealed to the housing 2, when necessary, by any satisfactory method which may be chosen.

In order to prevent the aforementioned environments from entering the interior of the detector housing through the tubing 24, the latter is made sufficiently long so that it terminates at a point which is out of these environments. Thus, for example, when the detector is located in the interior of a neutronic reactor, the tubing 24 is advantageously conducted out of the reactor to a remote point at which the auxiliary equipment is located and at which the open end of the tubing will not be subjected to the environments within the reactor.

The apparatus of Fig. 2

The stacked detecting portion of the Fig. 1 apparatus, shown generally at 1 in Fig. 1, may take several desirable forms in acordance with the present invention. One of such forms for the detecting portion 1 is shown in detail in the exploded view of Fig. 2 in combination with the top and bottom end plates 5 and 4 of the Fig. 1 apparatus which embrace the stacked portion 1. In Fig. 2, as in all of the other figures of the present application, like elements are provided with the same reference characters in all of the figures in which they appear.

The form of the detecting portion 1 shown in Fig. 2 includes a plurality of circular members which are adapted to be compactly stacked together in the order shown and to be secured by the rods 6 and nuts 7 between the end plates 4 and 5 to form a cylindrical, stacked assembly which will fit within the housing 2 in the manner shown in Fig. 1. Included in the group of members which constitutes the detecting portion 1 is a thermopile element 29 which is sensitive to neutrons as will be described hereinafter. The thermopile 29 carries the output terminals 13 and 14 and is arranged in the stacked assembly between an upper disk member 30 and a lower disk member 31, each of which is advantageously formed of an electrical insulating material, such as mica, and serves to electrically insulate the parts of the thermopile from the structure which is disposed on opposite sides thereof. The disks 30 and 31 are provided with centrally-located holes 32 and 33, respectively, which register with the central portion of the thermopile 29.

The group of elements 29, 30, and 31 is located between an upper plate member 34 and a lower plate member 35, each of which is advantageously formed of a material, such as aluminum, having the same desirable characteristics as those of the material for the housing 2 and the other housing structure members as described hereinbefore. Each of the plates 34 and 35 is provided with a respective peripheral notch 36 and 37 located so as to be in alignment with the thermopile terminals 13 and 14. The notch 36 in the plate 34 provides a space in which the leads 15 and 16 may lie when the stacked, cylindrical assembly of Fig. 2 is placed in the cylindrical interior of the housing 1, while the notch 37 in the plate 35 provides a space for the leads which are employed when several of the portions 1 are stacked together in a multiple arrangement of the type shown in Figs. 9 and 10 and to be described hereinafter.

The plate 34 is provided at its center with a downwardly extruded portion 38 which passes through the hole 32 in the disk 30 and engages the upper surface of the central portion of the thermopile 29 when the stacked assembly is drawn up and secured by the rods 6 and nuts 7 in the manner previously described. Similarly, the plate 35 is provided at its center with an upwardly extruded portion 39 which passes through the hole 33 in the disk 31 and engages the lower surface of the central portion of the thermopile 29 when the stacked assembly is drawn up.

The members 29, 30, 31, 34, and 35 are arranged between an upper spacer member 40 and a lower spacer member 41, each of which is advantageously formed of the same type of material as that employed for the members 34 and 35 as previously described. The spacers 40 and 41 are provided with respective centrally-located holes 42 and 43, and with respective peripheral notches 44 and 45. The holes 42 and 43 are provided for the purpose of receiving any deformation of the outer, adjacent surfaces of the respective plates 34 and 35 which may result when the assembly is secured tightly together and the extrusions 38 and 39 bear firmly in opposition against the central portion of the thermopile 29. The notches 44 and 45 are in vertical alignment with the other notches 36 and 37 and with the terminals 13 and 14, and serve the same purpose of providing lead space as is provided by the notches 36 and 37. This lead space is provided also by making the diameter of each of the members 29, 30, and 31 somewhat smaller than the diameters of the members 34, 35, 40, and 41, as can best be seen from Fig. 10 which will be described hereinafter.

Each of the circular members 29, 30, 31, 34, 35, 40, and 41 is provided with a pair of mounting holes which register with the rods 6 and through which these rods pass to hold the members in proper alignment when the members are secured together between the end plates 4 and 5. When the several elements shown in Fig. 2 have been assembled in the order shown and the nuts 7 have been tightened on the threaded outer ends of the rods 6 so as to draw the assembly tightly together, there results a compact structure which can be readily inserted into the housing 2 and secured therein by means of the plug 9 as shown in Fig. 1.

It has been found to be desirable in practice in some instances to place the stacked assembly, just described, in a suitable clamp, prior to the tightening of the nuts 7, and to squeeze the assembly together axially until firm contact is established between all of the members of the stack. Thereafter, the nuts 7 are tightened to prevent the stack from lengthening and to maintain the firm contact between the members once the assembly has been removed from the clamp.

The apparatus of Fig. 3

One desirable form which the neutron sensitive thermopile 29 of Fig. 2 may take in accordance with the present invention is illustrated by way of example in Fig. 3. As shown, this thermopile is basically a heat radiation sensitive thermopile of a well-known and extensively used form which has been modified for the purposes of the present apparatus so as to be neutron sensitive. Specifically, the thermopile 29 illustrated in Fig. 3 is basically a thermopile of the type which is disclosed and claimed in the Harrison et al. Patent No. 2,357,193 and which is in extensive commercial use in the radiation pyrometers manufactured and sold by applicants' assignee.

As shown, the thermopile 29 of Fig. 3 consists of ten V-shaped thermocouples 46 which are spot-welded, as at 47, to a group of eleven flat metal strips which are spaced radially around an annular mica sheet 48. Two of these metal strips constitute the aforementioned output terminals 13 and 14 as shown, and the remaining nine strips 49 form intermediate terminal members which are spaced at regular intervals around the center of the mica sheet 48. Each of the flat strips 13, 14, and 49 is formed of a suitable metal, such as constantan, and is fastened to the sheet 48 by means of extruded portions 50 of the strips which pass through suitable openings in the sheet 48 and are flattened over in snug contact with the latter.

Each of the ten thermocouples 46 includes a wire member 51 of a first metal, such as Chromel, and a wire member 52 of a second, dissimilar metal, such as constantan. The two wires 51 and 52 of each thermocouple are welded together at their inner ends to form a thermoelectric hot junction 53, and the thermoelectric cold junctions occur at those of the points 47 at which the outer ends of the Chromel wires 51 are welded to the constantan strips previously described. Each of the strips 49 has welded thereto at 47 the outer ends of the two, dissimilar wires 51 and 52 of adjacent ones of the thermocouples, whereby the electrical outputs of all of the ten thermocouples are connected together in series aiding relation between the output terminals 13 and 14.

As shown, the ten thermocouple hot junctions 53 are disposed closely together in a circular configuration surrounding the axis of the thermopile 29, whereby these junctions collectively form the hot junction structure of the thermopile at the central portion of the latter. The aforementioned thermocouple cold junctions are disposed in a circular configuration adjacent the inner peripheral edge of the annular sheet 48, and collectively form the cold junction structure of the thermopile. The hot junctions 53 are advantageously flattened to increase the effective surface thereof, thus imparting to these junctions the arrowhead-like shape shown in Fig. 3.

Since the construction and mode of operation of the basic thermopile structure as just described is fully disclosed and explained in the aforementioned Harrison patent, it will be sufficient for the present purposes to note herein that the thermopile 29 is essentially a differential temperature responsive device having a first temperature responsive element (the hot junction structure), a second temperature responsive element (the cold junction structure), and an output portion (including the terminals 13 and 14) in which the device is adapted to produce an electrical effect which is dependent upon the difference between the temperatures of the first and second responsive elements. In terms of the thermopile 29, this effect is an output voltage between the terminals 13 and 14 of a magnitude which is dependent upon the difference between the temperatures of the hot junctions 53 and the cold junctions at the welds 47.

The neutron sensitive thermopile 29 of Fig. 3 differs from the basic Harrison patent thermopile just described by omitting the black, heat absorbing coating which is applied to the hot junctions of the patent thermopile, and by including instead a coating of neutron sensitive material on its hot junctions 53. This coating is shown in Fig. 3 as covering the otherwise flat junctions 53 and imparting to them a somewhat rounded appearance, and may consist of any suitable neutron sensitive material applied to the junctions 53 in any suitable practical manner. Examples of such suitable neutron sensitive materials are:

$$Boron^{10} (B^{10})$$

$$Lithium^6 (Li^6)$$

$$Plutonium^{239} (Pu^{239})$$

$$Uranium^{233} (U^{233})$$

$$Uranium^{235} (U^{235})$$

The neutron sensitive material chosen for use in each particular situation should be one which is suitably sensitive to the particular type of neutrons which are to be detected. That is, the chosen neutron sensitive material should be one which is capable of suitably absorbing or capturing neutrons having energies within the energy range in which the measurement of the neutron flux is desired. For example, where neutrons in the slow or thermal range are to be detected for the measurement of the neutron flux, $boron^{10}$ may advantageously be employed as the coating material for the thermopile hot junctions 53, since $boron^{10}$ has a good neutron-capturing ability for slow or thermal neutrons. For the purpose of simplifying the present disclosure, it will be assumed throughout the description which follows that $boron^{10}$ is the neutron sensitive material employed in the various apparatus forms disclosed.

The neutron sensitive material, e. g. $boron^{10}$, may be applied to the thermopile hot junctions in any suitable, practical manner, as noted above. For example, a colloidal suspension of pure $boron^{10}$ in an oil base can be effectively painted on the hot junctions 53 to impart the desired neutron sensitivity to these junctions. One method of accomplishing this which has proved to be satisfactory in practice will now be described by way of illustration and example.

According to the exemplary procedure now to be described for applying the neutron sensitive $boron^{10}$ to the thermopile hot junctions 53, a suspension of elemental $boron^{10}$ in oil is applied in a thin coating to both sides of each of the flattened junctions using an extremely fine artist's paintbrush and working under a ten-power microscope. This suspension may well consist of 20% by weight of pure $boron^{10}$ dispersed in a suitable oil base. The thermopile with its painted hot junctions is then placed in a vacuum oven for a baking cycle of approximately one-half hour duration at approximately 750° F. The painting and baking procedures are then repeated as often as necessary to secure the deposition of the desired weight of $boron^{10}$ on the hot junctions, the determination of this weight being made by means of suitable weighings of the thermopile on an analytic balance. The final baking is carried out for two hours in order to insure complete volatilization of the oil base of the suspension, thereby insuring that the resulting coating on the junctions is pure $boron^{10}$.

By exercising reasonable care in the application of the suspension to the hot junctions, a desirably uniform distribution of $boron^{10}$ over the arrowhead-shaped junctions is insured. In order to avoid irregularities in the surface of the coating on the junctions, the suspension is applied only in a very small quantity, of the order of 0.2 to 0.4 mg. of $boron^{10}$, per application. Even when a very small final weight for the $boron^{10}$ coating is desired, it is advantageously applied in at least two applications or steps, with a baking cycle in between, in order to insure the production of a desirably uniform finished coating.

Operation of the apparatus of Figs. 1 through 3

When the detector of Fig. 1, including the elements shown in Figs. 2 and 3, is located within the neutron flux which is to be measured, the neutrons impinging on the neutron sensitive portion of the apparatus, consisting collectively of the neutron sensitive material carried by the several thermopile hot junctions 53, cause heat to be generated within this material at a rate which is dependent upon the incident neutron flux. Since the manner in which heat is produced in a neutron sensitive material as the result of the neutron bombardment thereof is well known in the art, the following brief description of this operation will be sufficient for the present purposes.

Assuming for illustrative purposes that the neutron sensitive material being considered is $boron^{10}$, it is noted that the absorption or capture by a boron atom of an incident thermal neutron causes the boron atom to split into an alpha particle and a lithium atom. The alpha particle is emitted in this reaction, causing the lithium atom to recoil. These two particles are slowed down as they move through the boron, and hence give up their kinetic energy to the latter, thereby increasing the kinetic energy of the boron. This amounts to the generation of heat within the boron, and results in an increase in the boron temperature.

However, the neutrons impinging on the remainder of the detector do not cause the generation of any significant amounts of heat therein, since the material from which the housing structure of the detector is formed is one having a relatively poor neutron capturing ability, as described hereinbefore. Therefore, the presence of the neutron flux surrounding the detector causes the temperature of the neutron sensitive portion of the detector, with its relatively good neutron capturing ability, to rise above the temperature of the housing structure portion of the detector, with its relatively poor neutron capturing ability. Thus, the temperatures of said portion and structure are caused to differ as a result of the incident neutron flux. For purposes of explanation, the so-called housing structure of the detector will be considered to include the housing 2, the cap 3, the members 4 and 5, and all other portions of the detector which are at substantially the same temperature as the housing and cap and which combine with the latter to constitute the thermal sink structure of the apparatus to be described below.

In order to permit the measurement of the rate at which the incident neutrons cause the generation of heat in the neutron sensitive material, thereby to obtain a measurement of the incident neutron flux, it is necessary to establish a suitable relationship between this rate of heat generation and the aforementioned temperature difference between the neutron sensitive material or portion and the housing structure of the detector. To this end, the detector housing structure is constructed and arranged to constitute a thermal sink: that is, a structure which is characterized by an ability to carry off heat at a relatively high rate. This is accomplished in part by making the housing or sink structure relatively massive and of such dimensions and of such material and with such a finish as to permit the structure to absorb, transmit, and lose heat to the atmosphere at a desirable rate, and in part by employing a material for the structure which has good thermal conduction characteristics for providing substantial equality of temperature throughout the structure, as previously mentioned. As a result, the temperature of the sink structure remains at a substantially constant value, notwithstanding the flow of heat thereto from the neutron sensitive portion.

Also to the end of establishing said relationship, the detector of the present invention now being described is provided with a solid thermal or heat conducting connection of relatively good thermal conductance which is located between the neutron sensitive portion and the sink structure and which maintains these two parts in good heat transfer relationship. This solid thermal connection is provided in the apparatus form of Fig. 2 by equipping the plates 34 and 35 with the respective extrusions 38 and 39, by arranging these extrusions to be in solid contact with the neutron sensitive portion at the center of the thermopile, and by arranging the plates 34 and 35 in solid contact with the remainder of the sink structure, as will be more fully discussed hereinafter. By virtue of this construction, the said solid thermal connection is advantageously arranged to be independent of the thermopile 29 and its elements, thereby to provide the important feature of readily preselectable sensitivity and response speed characteristics for the apparatus as will be discussed more fully hereinafter.

The presence of the above-mentioned solid thermal connection in the subject apparatus permits the heat generated in the neutron sensitive portion by the incident neutrons to flow from this portion to the sink structure over the solid thermal conduction path which extends through said thermal connection. As those skilled in the art will understand, this heat flow occurs as a result of the aforementioned temperature difference which is produced between the neutron sensitive portion and the sink structure by the incident neutron flux.

As will also be apparent, and as will be more fully discussed hereinafter, the heat which the incident neutrons generate in the neutron sensitive portion causes the above mentioned temperature difference to assume a value which is that required to cause the above-mentioned heat flow from said portion to the sink structure to take place at the same rate as that at which the heat is being generated in said portion. Accordingly, said temperature difference has a value which is dependent upon said rate of heat generation and hence upon the magnitude of the incident neutron flux.

As will also be discussed more fully below, the value which said temperature difference is caused to assume in order to make the rate of heat flow from said portion equal to the rate of heat generation in the latter is also dependent upon the magnitude of the thermal conductance of said path over which the heat flow takes place. Thus, for a given rate of said heat generation, the value of said temperature difference is dependent upon the value of the last mentioned thermal conductance.

It is clear from the foregoing that the rate of heat flow from the neutron sensitive portion to the sink structure is dependent upon the rate of heat generation in said portion, and hence is dependent upon the magnitude of the incident neutron flux. It is also clear that the temperature difference which produces this heat flow has a value which is solely dependent upon the rate of heat generation, and hence upon the magnitude of the neutron flux, for any given value of the thermal conductance of the path over which this heat flow takes place.

For the purpose of providing a somewhat simpler explanation of the operation of the subject detector, the above-described temperature difference can conveniently and validly be thought of as a temperature drop which occurs across the thermal conductance path between the neutron sensitive portion and the sink structure as a result of the aforementioned heat flow between said portion and structure. In accordance with this form of explanation, it can be stated that said heat flow from said portion to said structure causes the development of a temperature difference or drop between said portion and structure having a value which is jointly dependent upon the rate at which said heat flow takes place and upon the value of the thermal conductance of the path between said portion and structure. Since said rate of heat flow is dependent upon the magnitude of the incident neutron flux, as explained above, the temperature difference which it produces is thus dependent upon the magnitude of the neutron flux for any given value of said thermal conductance.

Irrespective of whether it is considered that the heat flow between said portion and structure produces said temperature difference, or whether it is considered that the latter produces said heat flow, it is clear from the above explanations that the subject detector includes means which establish a predetermined relationship between the rate at which the incident neutrons generate heat in said portion and the value of said temperature difference, and which cause this temperature difference to have a value which is dependent upon the value of the incident neutron flux. Therefore, a device which will be responsive to this temperature difference between the neutron sensitive portion and the sink structure will provide a measure of the incident neutron flux. The thermopile 29 is such a temperature difference responsive device, as was previously brought out herein, and is arranged so that its electrical output is a measure of said temperature difference and hence of the incident neutron flux as will now be described.

With reference to Fig. 2, it is noted that the firm stacking of the several members in the order shown results in the plates 34 and 35 being maintained in solid contact and hence in good heat transfer relationship with the remainder of the sink structure as previously mentioned. Moreover, this firm stacking arranges the cold junctions or cold junction structure of the thermopile, including the strips 14 and 49, in good heat transfer relationship with the plates 34 and 35 and the remainder of the sink structure, the mica disks 30 and 31 serving to insulate the thermopile strips 13, 14, and 49 from electrical contact with the plates 34 and 35. By virtue of the foregoing construction, the cold junction, temperature sensitive portion of the thermopile 29 is made to be responsive to the temperature of the sink structure of the apparatus, and is actually maintained substantially at this temperature.

As previously described, the neutron sensitive portion of the apparatus of Figs. 1 through 3 consists collectively of the neutron sensitive material which coats the several hot junctions or the hot junction structure of the thermopile 29. Therefore, this neutron sensitive portion is arranged in good heat transfer relationship with the thermopile hot junction structure. By virtue of this construction, the hot junction, temperature sensitive portion of the thermopile 29 is made to be responsive to the temperature of the neutron sensitive portion of the apparatus.

As will be apparent from the descriptions given in the last two paragraphs above, the differential temperature responsive thermopile 29 is made to be responsive to the temperature difference between the neutron sensitive portion and the sink structure, since the thermopile hot and cold junction structures are arranged to be responsive to the respective temperatures of the neutron sensitive portion and the sink structure. Accordingly, in view of the foregoing description, it is apparent that the thermopile 29 is operative to produce an output E. M. F. which is dependent in magnitude upon that of the incident neutron flux.

In connection with the foregoing references to the temperature of the neutron sensitive coating portion, it should be noted that this portion does not actually have the same temperature throughout its structure. Instead, said portion has a maximum temperature somewhere below its outer surface, due to the fact that the incident neutrons cause the heat which is produced in said portion to be generated in the interior thereof. Further, said portion has a minimum temperature at its outer surface, which is in contact with the extrusions 38 and 39 of the sink structure, since the good heat transfer relationship between the sink structure and this surface causes the latter to be held at the temperature of the sink structure. Moreover, the temperature of the inner surface of said portion, and hence the temperature of the thermopile hot junction structure which is in good thermal contact with this surface, is somewhat lower than said maximum temperature, due to the inherent heat loss from the hot junction structure to the sink, but is directly proportional to said maximum temperature. Thus, the neutron sensitive portion is not actually at the same temperature throughout its structure.

However, for the purpose of simplifying the description and explanation of the present invention, it is the temperature of the inner surface of the neutron sensitive portion and of the thermopile hot junction structure which is meant herein when reference is made to the temperature of the neutron sensitive portion of the apparatus.

It can be seen from the foregoing that the heat which was described above as flowing to the sink structure from the neutron sensitive portion actually flows through the latter along the temperature gradient which exists between the maximum temperature inside of said portion and the minimum or sink temperature at the junction of good thermal conductance provided between the outer surface of said portion and the sink structure extrusions 38 and 39. Thus, the aforementioned thermal conduction path over which this heat flow takes place actually extends from within said portion, through the latter, and thence to the sink structure through said junction. For the purpose of simplifying the present description and explanation, however, it is assumed herein that said path extends from said inner surface of the neutron sensitive portion and through the latter to the sink structure at said junction, and hence that the temperature difference to which the thermopile is responsive is the difference between the temperature of the neutron sensitive portion at one end of said path and the temperature of the sink structure at the other end of said path.

The electrical output of the thermopile 29 can be measured in the usual manner by connecting the output leads 15 and 16 to the input terminals of any of the many known types of instruments which are suitable for measuring the electrical output of a thermopile. If desired, the scale of the instrument employed may be calibrated directly in units of neutron flux, and the instrument may be used for indicating, recording, and/or controlling purposes as required.

Summarizing the foregoing, the thermopile 29 is responsive to the difference between the temperatures of its hot and cold junction structures, and produces between the terminal strips 13 and 14 an output E. M. F. of a magnitude which is dependent upon this junction temperature difference. The latter, in turn, is dependent upon the temperature difference between the neutron sensitive portion and the sink structure of the apparatus, and this temperature difference is dependent upon the rate of flow of heat between the neutron sensitive portion and the sink structure. This rate of heat flow is in turn dependent upon the rate at which incident neutrons generate heat in the neutron sensitive portion, and this rate of heat generation is dependent upon the magnitude of the incident neutron flux. Therefore, the magnitude of the output of the thermopile 29 is dependent upon, and hence is a measure of, the magnitude of the incident neutron flux.

*Detector sensitivity and response speed*

The significance of the above-mentioned solid thermal connection provided by the novel construction of the detector according to the present invention which has just been described will now be treated more fully in order to illustrate the importance of this connection as a means for predetermining or controlling or establishing the sensitivity and response speed characteristics of the detector. In regard to this, it is noted that, for any given value of incident neutron flux, and hence for any given value of heat input to the neutron sensitive portion of the detector, the magnitude of the resulting temperature difference between said portion and the sink structure of the detector, and hence the magnitude of the resulting thermopile output E. M. F., is inversely proportional to the magnitude of the thermal conductance which exists between said portion and structure. This means that the final thermopile and detector output for a given value of incident neutron flux is inversely proportional to the value of said thermal conductance, and hence that the detector sensitivity is inversely proportional to said thermal conductance value. The foregoing statements assume that other factors remain constant, and this assumption will be continued throughout the remainder of this description unless otherwise noted.

The fact that the detector sensitivity is inversely proportional to the value of the thermal conductance which is present between the neutron sensitive portion and the sink structure can be explained by noting that the continued generation of heat in said portion of some fixed rate, caused by the presence of some fixed value of incident neutron flux, causes the temperature of said portion to rise until said portion loses heat to said structure through said thermal conductance at the same rate at which the heat is generated in, or added to, said portion. Also, the final value to which the temperature of said portion rises under this condition is dependent upon the ease with which said portion can lose heat to said structure, and hence upon the value of said thermal conductance. Thus, the higher or better this conductance is, the easier it is for the heat to flow from said portion and through this conductance to said structure, and the lower is the resulting temperature of said portion necessary to establish and maintain the necessary outward heat flow to said structure. Conversely, the lower or poorer this conductance, the more difficult it is for the heat to flow from said portion to said structure, and the higher is the resulting temperature of said portion necessary to establish and maintain the necessary outward heat flow to said structure.

Therefore, the final temperature of said portion for any given value of neutron flux is inversely proportional to the value of said thermal conductance, and, since the temperature of said structure can be assumed to be constant for the purposes of the present explanation, it is apparent that the thermopile and detector output are also inversely proportional to the value of said thermal conductance for a given neutron flux value. Since the value of said thermal conductance thus determines the relationship between the value of the incident neutron flux and the final detector output which results from this flux value in the manner just described, it is apparent that this thermal conductance value determines the detector sensitivity, and that this sensitivity is inversely proportional to said thermal conductance value.

In view of the foregoing description and explanation, it should be readily apparent that the response speed of the subject detector of the present invention is also dependent upon the magnitude or value of the thermal conductance which is present between the neutron sensitive portion and the sink structure, and is actually determined by said magnitude, other factors remaining constant. Thus, for any given change in the value of the incident neutron flux, and hence for any given change in the rate of generation of heat in said portion, the speed with which the temperature of said portion changes correspondingly is directly proportional to the value of said thermal conductance. Therefore, the speed with which the thermopile and detector output changes to a new value to correspond to a new value of neutron flux is proportional, for a given flux value change, to the value of said thermal conductance. This means that the detector response speed is proportional to said conductance value, other factors remaining constant as stated before.

The foregoing fact can be explained by noting that the ease with which said portion can lose heat to said structure is determined by the value of said thermal conductance between these parts, as previously described. Therefore, the higher the value of this conductance, the faster the temperature of said portion is able to change as the result of a change in the rate at which heat is being added or generated in said portion, and hence as the result of a change in the value of the incident neutron flux. Conversely, the lower the value of said conductance, the slower the temperature of said portion changes for a given change in flux value. Accordingly, the rate or speed of response of the temperature of said portion, and hence the rate or speed of response of the detector output, to a change in the incident neutron flux is directly proportional to the value of the thermal conductance between said portion and structure.

As was previously explained, the extrusions 38 and 39 of the sink structure plates 34 and 35 are included in the present detector and are maintained in good, solid thermal contact with the neutron sensitive portion of the detector, carried by the thermopile hot junction structure, for the purpose of providing a solid thermal connection of relatively good thermal conductance between the neutron sensitive portion and the sink structure which is independent of the thermopile and which causes said portion and structure to be in good heat transfer relationship with each other. This thermal connection is put into the subject apparatus for the express purpose of providing therein a solid thermal conduction path, between said portion and structure, the thermal conductance of which forms the major portion of the aforementioned thermal conductance which exists between said portion and structure and whose value determines the detector sensitivity and response speed. To this end, said thermal connection is advantageously arranged to contribute such a value of thermal conductance between said portion and structure so as to cause the over-all value of this conductance to be determined by said connection, and to be that required to give the detector the desired sensitivity and response speed characteristics. In other words, said thermal connection is provided in the subject apparatus for the purpose of having therein a means by which the detector sensitivity and response speed characteristics can be readily selected and determined, such selection and determination being effected by arranging said thermal connection so as to impart the necessary value to the thermal conductance between the neutron sensitive portion and the sink structure of the detector.

If said thermal connection, with its ability to establish the net thermal conductance between said portion and structure, were not provided in the subject apparatus, the thermal conductance between said portion and structure would have a value which would be jointly determined by several factors, such as the conductance of the thermopile wires 51 and 52 and the spacing and nature of the walls of the sink structure adjacent said portion. Therefore, the detector sensitivity and response speed would be dependent upon these factors also, and it would clearly be considerably difficult, if not impractical or even impossible, to so arrange and correlate all of these factors as necessary to provide the detector with the particular sensitivity and response speed desired or required for a given application. However, by the use of said thermal connection with its ability to predetermine the thermal conductance between said portion and structure, it is possible to provide the detector with the desired or required sensitivity and response speed in a highly practical and advantageous manner.

As those skilled in the art will readily understand, said thermal connection can be made to provide the desired value of thermal conductance between said portion and structure of the subject apparatus by the proper selection of such items as the size, nature, and thickness of the extrusions 38 and 39, the force with which the latter contact the neutron sensitive portion, the thickness of the latter, etc. The important thing is that said thermal connection is independent of the thermopile, whereby the final thermal conductance value between said portion and structure, and hence the detector sensitivity and response speed, are determined by the conductance of said thermal connection and hence by the characteristics of the arrangement producing this connection, and are not determined by the characteristics of the thermopile or the other portions of the apparatus.

While the foregoing is of great significance with respect to the predetermining and selection of the sensitivity of the detector, it is probably of even greater significance with respect to the predetermining and selection of the detector response speed. For certain applications of a neutron detector of the type being described, it is essential that the detector have a faster response speed than would be obtainable without the use of the aforementioned thermal connection of the present invention. For example, the response speed requirements for a neutron detector which is to be employed in connection with the control of a neutronic reactor are often so severe that they would preclude the satisfactory use of a detector of the type disclosed in the present application if said thermal connection were not present in the detector to provide the latter with the required high response speed characteristic. Thus, said thermal connection is a highly desirable and practical means by which the detector of the present invention can be provided with a predetermined, sufficiently high value of thermal conductance between the neutron sensitive portion and the sink structure to endow the detector with the necessary high response speed required for the majority of neutron flux determining applications.

Since the detector sensitivity is inversely proportional to the value of said thermal conductance between said portion and structure, while the detector response speed is directly proportional to this conductance value, it follows that a change in said value which increases either the detector sensitivity or response speed will cause a decrease to occur in the other of these characteristics. Accordingly, for any given application, said conductance value must be so chosen as to provide the detector with the highest possible sensitivity or response speed which does not result in too low a value of the other of these characteristics. Which characteristic is to be favored depends, of course, on the nature of the particular application, since in some instances it is necessary to obtain as high a sensitivity as possible, while other situations demand as high a response speed as can be obtained. In any situation, however, the use of the said thermal connection in the detector of the present invention permits the ready determination and adjustment of the value of said thermal conductance to the value required to give the desired sensitivity and response speed characteristics to the detector, and to permit the attainment of the optimum compromise between these two characteristics, for the particular application involved.

Figure 4:
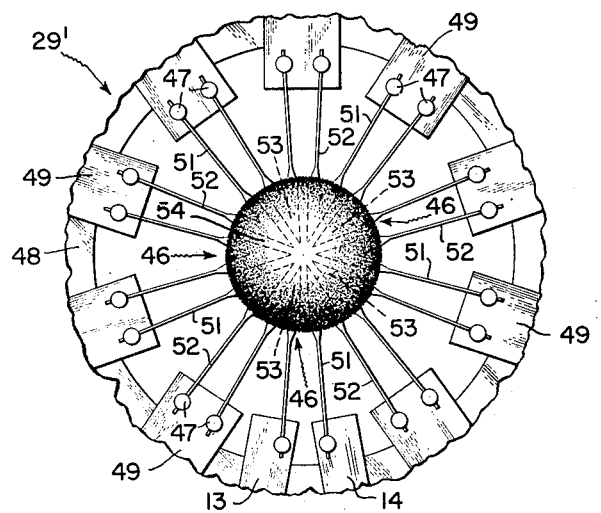
Fig. 4 is a view of a different form of thermopile element which may be used in the arrangement of Fig. 2.

The apparatus of Fig. 4

In Fig. 4 there is illustrated a portion of another form which the thermopile 29 of Fig. 2 may take. The thermopile of Fig. 4, which bears the reference character 29', is a modification of the Fig. 3 thermopile, and differs from the latter solely in respect to the manner in which the neutron sensitive material portion is arranged with respect to the thermopile hot junctions 53. Thus, in the thermopile 29', the neutron sensitive coating is in the form of a somewhat spherical bead 54 as shown, this bead substantially completely enveloping the hot junctions 53. Such a neutron sensitive bead-like coating may be formed of any suitable neutron sensitive material, such, for example, as one of the several materials listed hereinbefore, and may be constructed in any manner which produces a bead of the desired shape and dimensions on the hot junction structure. For example, the bead 54 may be formed of a mixture of powdered boron[10] and a suitable binder, such as Sauereisen cement, applied to the flattened hot junctions 53 in the quantity desired and allowed to air dry. This method is one which has proved to be satisfactory in practice, and is described herein to illustrate one practical and satisfactory way in which the thermopile 29' may be constructed.

The thermopile 29' may be employed in the apparatus of Figs. 1 and 2, in lieu of the thermopile 29, for those applications which require a detector having a neutron sensitive portion of greater mass than that readily obtainable for the neutron sensitive portion of the thermopile 29. For example, the relatively large masses obtainable for the coating portion 54 of the thermopile 29' may well render the latter suitable for use in certain applications requiring a detector having a relatively low speed of response.

The neutron sensitive coating portion 54 of the thermopile 29' may take other forms than the somewhat spherical form illustrated by way of example in Fig. 4. For example, if a neutron sensitive coating in the form of a disk is desired or required, such a coating may be formed by painting the flattened hot junctions 53 and the spaces between them with the aforementioned suspension of boron[10] in oil within the confines of a fine wire arranged to encircle the hot junctions at their outer edges. Such a wire may be held in place by being laced through the spaces between the wires 51 and 52, and serves to provide a boundary for the applied suspension. The resulting disk should be built up gradually, by the use of alternate painting and baking steps as previously described in connection with the thermopile 29, so as to insure the production of the desired disk shape. When the disk has reached a substantial thickness, the fine wire boundary member may be removed and the disk thickness then increased to the desired value by the application of the necessary number of additional thin coats of the suspension. By this method, which has been described by way of example, the desired thickness of the neutron sensitive portion is readily obtained, and the sensitivity and response speed characteristics for the associated detector are thus readily determined.

In some applications involving the use of a thermopile of the type shown in Fig. 4, it may be found to be desirable to omit the extrusions on the plates 34 and 35, and to cause the bead or disk shaped neutron sensitive portion on the thermopile hot junction structure to pass through the openings 32 and 33 in the respective disks 30 and 31 and to be held directly in good thermal contact with the flat plate surfaces. Likewise, the extrusions 38 and 39 may be omitted, if desired, when using a thermopile of the type shown in Fig. 3 which has a sufficiently thick neutron sensitive coating on the thermopile hot junctions to permit this coating to contact the plates 34 and 35 directly through the openings 32 and 33.

Figure 5:
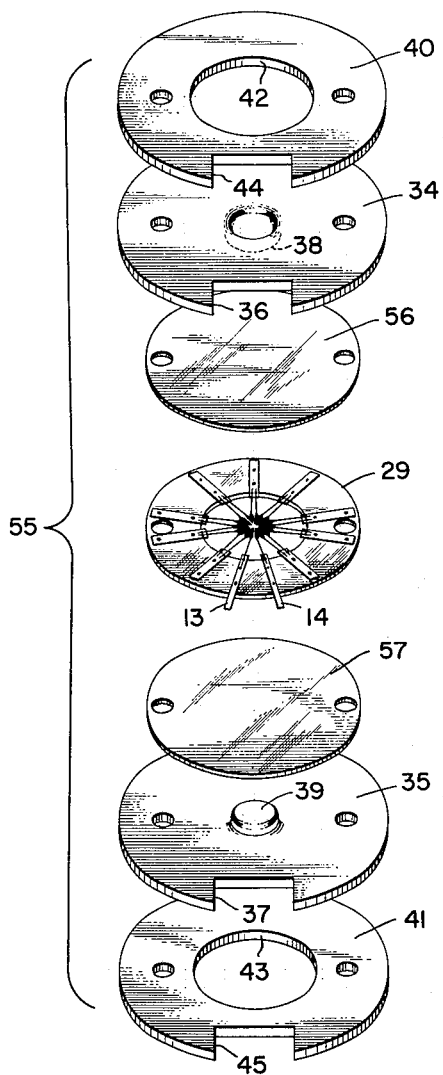
Fig. 5 is an exploded view of a modification of the detecting arrangement of Fig. 2.

The apparatus of Fig. 5

Another form which the detecting portion of the Fig. 1 detector may take is shown in Fig. 5, wherein there is illustrated a modification 55 of the detecting portion 1 of Fig. 2. The arrangement of Fig. 5 is the same as that of Fig. 2 except that the apertured mica disks 30 and 31 of the Fig. 2 form are replaced in the Fig. 5 arrangement by respective solid mica disks 56 and 57. Accordingly, the extrusions 38 and 39 of the respective plates 34 and 35 of the arrangement 55 bear on the respective mica disks 56 and 57 and cause the latter to be in firm contact with the neutron sensitive portion on the thermopile hot junction structure. Therefore, the extrusions 38 and 39 of the arrangement 55 are not in direct contact with the neutron sensitive portion, but instead are separated from this portion by the thickness of the mica of the respective disks 56 and 57. Thus, the solid thermal connection between the neutron sensitive portion and the sink structure in the arrangement 55 includes the disks 56 and 57, and the thermal conduction path through said connection extends through and is partly located in these disks.

As a result of the construction just described, the thermal conductance of the disks 56 and 57 between the extrusions 38 and 39 and the neutron sensitive portion is a part of the net thermal conductance existing between this portion and the sink structure. That is, the presence of the disks 56 and 57 between said portion and the extrusions 38 and 39 and the remainder of the sink structure causes the value of the thermal conductance of said connection between said portion and structure to be dependent upon the value of the thermal conductance of the disks 56 and 57, and hence upon the nature and thickness of the latter. Therefore, the arrangement 55 includes an additional means by which the value of the net thermal conductance between said portion and structure, and hence the sensitivity and response speed characteristics of the detector, can be determined and controlled.

For a given detector including a portion 55 as shown in Fig. 5, an increase in the thickness of the disks 56 and 57 results in a decrease in the value of the thermal conductance between the radiation sensitive portion and the sink structure, and hence results in an increase in the detector sensitivity and a decrease in the detector response speed, other factors remaining constant. Conversely the thinner the disks 56 and 57, the lower the sensitivity and the higher the response speed of the detector. In general, the construction shown in Fig. 5 provides higher detector sensitivity and slower detector response speed than are obtainable with the construction shown in Fig. 2.

The solid mica disks 56 and 57 also serve in the Fig. 5 arrangement to electrically insulate the thermopile wires from the sink structure plates 34 and 35 in the event that the neutron sensitive coating becomes damaged or otherwise fails to provide such electrical insulation. Mica is thus a desirable material for use as the disks 56 and 57, since mica is characterized by having the good electrical insulating properties required for the above electrical insulating function as well as the relatively good thermal conductance properties required for providing the good heat transfer relationship between the neutron sensitive portion and the sink structure. Certain ceramic materials also possess these properties in varying degrees, and hence may be employed for the disks 56 and 57 in lieu of the mica if desired.

As in the case of the Fig. 2 arrangement, the arrangement 55 of Fig. 5 may include either of the types of thermopile respectively illustrated in Figs. 3 and 4. Moreover, the extrusions 38 and 39 may be omitted from the respective plates 34 and 35 of the Fig. 5 arrangement in those cases where the neutron sensitive portion is of such dimensions as to cause the disks 56 and 57 to bear firmly on the neutron sensitive portion, and to be in good thermal contact therewith, as a result of the respective plates 34 and 35 being pressed and held firmly in contact with the disks 56 and 57.

Figure 7:
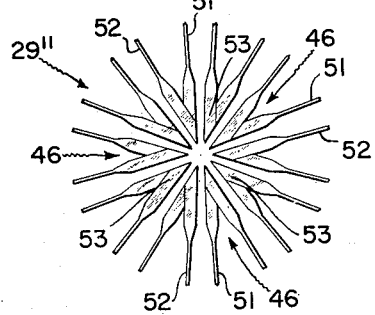
Fig. 7 is a view of one form of a thermopile element which may be used in the arrangement of Fig. 6.
Figure 6:
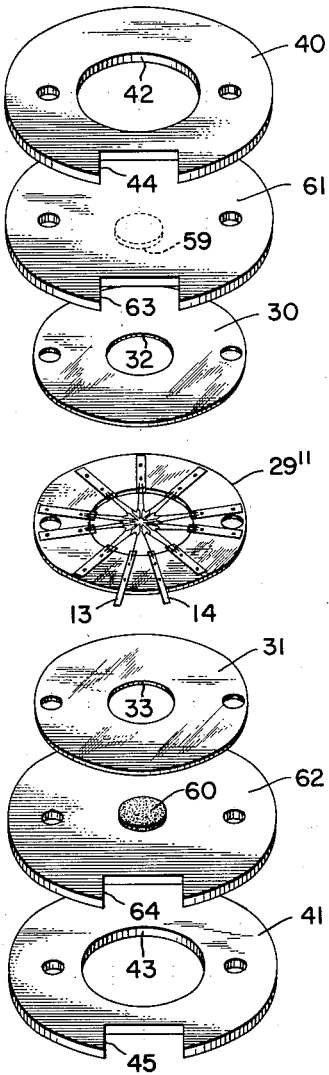
Fig. 6 is an exploded view of a different form for the detecting portion of the detector of Fig. 1.

*The apparatus of Figs. 6 and 7*

Still another form which the detecting portion of the Fig. 1 detector may take is illustrated in Fig. 6. This arrangement, which bears the reference character 58, differs essentially from the detecting portions of Figs. 2 and 5 by including a neutron sensitive portion which is not carried by the thermopile hot junction structure, but which instead is carried and supported by a part of the sink structure of the apparatus.

To this end, the neutron sensitive portion of the arrangement 58 consists of two disk-shaped members 59 and 60 which may be formed of any suitable neutron sensitive material, such, for example, as one of the several materials listed hereinbefore. The disks 59 and 60 are secured to and supported by respective plates 61 and 62 which are similar to the plates 34 and 35 of the arrangements of Figs. 2 and 5, and which replace the plates 34 and 35 in the arrangement 58. The disks 59 and 60 may be secured to the respective plates 61 and 62 in any desired, practical manner, such as that to be described hereinafter in connection with the apparatus of Fig. 8. Unlike the plates 34 and 35, the plates 61 and 62 are not provided with any extrusions, but instead are plain, flat plates advantageously formed of the same material as employed for the remainder of the sink and housing structure. The plates 61 and 62 are provided with respective notches 63 and 64 which serve the same purpose of providing lead wire passages as was served by the notches 36 and 37 of the plates 34 and 35, as previously described.

Since the neutron sensitive portion of the arrangement 58 is supported by a part of the sink structure of the apparatus, the thermopile 29″ included in the arrangement 58 is not in itself neutron sensitive, and has no neutron sensitive material supported by its hot junction structure. Instead, the thermopile 29″ may have a plain, uncoated hot junction structure as shown in Fig. 7, wherein there is illustrated the central portion of such a plain thermopile. Thus, the thermopile 29″ may well be of the form of the basic thermopile which is employed in the arrangements of Figs. 3 and 4 and to which a neutron sensitive portion is added to form the neutron sensitive thermopiles of the latter two figures.

In accordance with the foregoing, the hot junction structure of the thermopile 29″ preferably consists of the flattened, uncoated junctions 53 between the welded thermocouple wires 51 and 52 as shown in Fig. 7. Therefore, the thermopile 29″ may be identical to the thermopile 29 fully shown in Fig. 2 except for the omission of any coating from the hot junction structure of the thermopile 29″.

Returning to the description of the arrangement 58 of Fig. 6, the neutron sensitive disk 59 is seen to be centrally mounted and secured on the lower face of the plate 61, while the neutron sensitive disk 50 is centrally mounted and secured on the upper face of the plate 62. Thus, the neutron sensitive material of the Fig. 6 arrangement is supported independent of the thermopile 29″, but is arranged in good heat transfer relationship with the thermopile hot junction structure when the arrangement 58 is assembled into its tightly stacked condition. When the arrangement 58 is so assembled, the disks 59 and 60 are caused to pass through the respective holes 32 and 33 in the respective mica disks 30 and 31 and to contact the central, hot junction portion of the thermopile 29″. This causes the unattached, inner faces of the disks 59 and 60 to be securely pressed against the thermopile hot junction structure on the opposite sides thereof, whereby these faces are maintained in good thermal contact with the hot junction structure. The plates 61 and 62 may be provided with raised central portions where this is found necessary to assure firm mechanical contact and good thermal contact between the disks 59 and 60 and the thermopile hot junction structure, as when the disks 59 and 60 are necessarily especially thin.

Moreover, the construction of the arrangement 58 as just described insures that the neutron sensitive disks are maintained in good heat transfer relationship with the sink structure of the detector, which structure in turn is maintained in good heat transfer relationship with the thermopile cold junction structure. These thermal relationships are provided in the arrangement 58, as they are in the arrangements 1 and 55, by the firm contact maintained in the tightly stacked arrangement between the neutron sensitive disks 59 and 60 and the respective plates 61 and 62, and between the latter and the cold junction structure of the thermopile and the remainder of the sink structure.

It can be seen from the foregoing description that the aforementioned solid thermal connection of relatively good thermal conductance which is provided between the neutron sensitive portion and the sink structure of the detector according to the present invention is provided in the Fig. 6 arrangement 58 by the maintenance of the neutron sensitive disks 59 and 60 in firm contact with the respective plates 60 and 61 which are, in turn, maintained in firm contact with the remainder of the sink structure of the apparatus. Therefore, the operation of the arrangement 58 in the detector of Fig. 1 is the same as that described hereinbefore in regard to the apparatus forms of Figs. 2 and 5.

By virtue of the construction of the arrangement 58 as just described, the thermal conductance of the path between the neutron sensitive portion and the sink structure can be made to assume relatively high values. Accordingly, the arrangement 58 is well suited for use in applications requiring a detector having relatively high response speed characteristics.

*The apparatus of Fig. 8*

A preferred form which the detecting portion of the Fig. 1 detector may take is shown in Fig. 8, wherein there is illustrated a modification 65 of the detecting portion 58 of Fig. 6. The common feature included in both of the arrangements 58 and 65 is the use of a neutron sensitive portion in the form of two disks of a neutron sensitive material which are mounted and supported independent of the thermopile. The arrangement 65 differs essentially from the arrangement 58, however, as to the means which carry and support the neutron sensitive disks. Thus, the arrangement 65 includes the plain mica disks 56 and 57 of the Fig. 5 arrangement in lieu of the apertured disks 30 and 31 of Figs. 2 and 6, and the neutron sensitive disks 59 and 60 are mounted on the respective mica disks 56 and 57. Since the neutron sensitive portion of the arrangement 65 is not carried by the thermopile, this arrangement includes the plain hot junction thermopile 29″ of Fig. 7 as shown.

The neutron sensitive disk 59 of the detecting portion 65 is centrally mounted and secured on the lower face of the mica disk 56, while the neutron sensitive disk 60 is centrally mounted and secured on the upper face of the mica disk 57, all as shown in Fig. 8. The disks 59 and 60 may be formed and secured to the faces of the respective mica disks 56 and 57 by any desired, practical method. One preferred method for accomplishing this which has been found to be highly satisfactory in practice will be described hereinafter by way of example.

The detecting portion 65 also includes the plates 34 and 35 with their respective centrally-located extrusions 38 and 39 as employed in the arrangements of Figs. 2 and 5. Therefore, when the stacked assembly of the arrangement 65 is drawn-up and tightly secured, the extrusions 38 and 39 bear firmly through the respective mica disks 56 and 57 on the respective neutron sensitive disks 59 and 60 with which the excursions are in register. Thus, the inner, unattached faces of the disks 59 and 60 are pressed firmly against the opposite sides of the thermopile hot junction structure, and are maintained in good heat transfer relationship with this structure. Also, the attached faces of the disks 59 and 60 are maintained in good heat transfer relationship with the respective extrusions 38 and 39, and the remainder of the sink structure, through the respective mica disks 56 and 57. The thermopile cold junction structure is maintained in good heat transfer relationship with the plates 34 and 35 and the remainder of the sink structure by the firm stacking of the arrangement as in the previously described detector portions.

From the foregoing it can be seen that the aforementioned solid thermal connection of relatively good thermal conductance which is provided between the neutron sensitive portion and the sink structure of the detector according to the present invention is provided in the Fig. 8 arrangement 65 by the maintenance of the neutron sensitive disks 59 and 60 in firm contact through the respective mica disks 56 and 57 with the respective extrusions 38 and 39 of the sink structure plates 34 and 35. Accordingly, the solid thermal conduction path through said connection extends through and is partly located in the mica disks 56 and 57, as in the arrangement of Fig. 5.

As a result of the construction of the arrangement 58 as just described, the thermal conductance of the mica disks 56 and 57 between the extrusions 38 and 39 and the respective neutron sensitive disks 59 and 60 is a part of the net, total thermal conductance existing between the neutron sensitive portion and the sink structure. That is, as in the case of the arrangement of Fig. 5, the presence of the disks 56 and 57 between said portion and structure causes the value of the said net thermal conductance to be dependent upon the value of the thermal conductance of the disks 56 and 57, and hence upon the nature and thickness of the latter. Therefore, the arrangement 65 includes a means in the form of the disks 56 and 57 by which the value of the net thermal conductance between said portion and structure, and hence the sensitivity and response speed characteristics of the detector, can be determined and controlled.

From the foregoing it can be seen that the arrangement 65 of Fig. 8 embodies two significant features which are not present together in any of the other disclosed forms of the detecting portion of the detector of Fig. 1. Thus, the arrangement 65 includes both the feature of the disks 56 and 57, with their influence on the detector characteristics, which is included in the Fig. 5 arrangement but not in those of Figs. 2 and 6, and the feature of the separate neutron sensitive portion independent of the thermopile which is included in the Fig. 6 arrangement but not in those of Figs. 2 and 5. Therefore, the Fig. 8 arrangement combines the features of the arrangements of Figs. 5 and 6, and hence has been designated as the preferred one of the illustrated forms of the detector of the present invention.

The practical significance of the first of the above features of employing the disks 56 and 57 in the arrangements of Figs. 5 and 8 to permit the ready determination and adjustment of the detector characteristics by the proper selection of the material and thickness of these disks should be readily apparent from the foregoing description. Also of practical significance is the second feature, embodied in the arrangements of Figs. 6 and 8, of providing the neutron sensitive portion in the form of two disk-shaped members, and of arranging these disks to be supported in the apparatus by means other than the thermopile. This feature is of practical importance because it has been determined that the neutron sensitive portion can be more readily made to have the desired weight, and can be more easily fabricated and handled, when it is in the form of disks or similarly shaped portions which are separate from the thermopile than when it is in the form of a coating or mass which must be applied to and carried by the thermopile hot junction structure.

As in the case of the Fig. 5 arrangement, the solid mica disks 56 and 57 also serve in the Fig. 8 arrangement to electrically insulate the thermopile wires from the sink structure plates 34 and 35 in the event that the neutron sensitive disks 59 and 60 become damaged or otherwise fail to provide such electrical insulation. Thus, mica is a desirable material for use as the disks 56 and 57 in the Fig. 8 arrangement for the same reasons as set forth above in connection with the Fig. 5 arrangement.

The aforementioned preferred method of forming the neutron sensitive disks 59 and 60 and of mounting and securing them on the mica disks 56 and 57 will now be described. Although this method is directed specifically to the mounting of the disks 59 and 60 on the mica disks 56 and 57 in apparatus of the type shown in Fig. 8, it is noted that this general method also may be employed for mounting the disks 59 and 60 on the plates 61 and 62 in apparatus of the type shown in Fig. 6.

According to the method of producing a boron$^{10}$ disk on a mica supporting disk now to be described by way of illustration and example, a mica disk of the proper diameter is first blanked out of a piece of natural mica having a suitable thickness, such, for example as 0.002 inch. As previously noted, the value of this thickness is employed to predetermine the sensitivity and response speed characteristics of the detector. The guide holes for the rods 6 are then placed in the mica disk in the proper positions. The center portion of one face of the disk is then roughened, as by sand blasting. An artist's abrasive air gun using a fine abrasive erasing compound is suitable for use in performing this step.

By the use of a piece of thin-walled tubing or a similar device, a thin ring of a silicone grease 0.25 inch in diameter is placed at the center of the disk within the roughened area, and this ring is filled with the aforementioned suspension of elemental boron$^{10}$ in oil, using a hypodermic syringe. The disk with its filled ring is then baked in a vacuum oven at approximately 750° F. for approximately one hour.

Following the completion of the above, the coated spot at the disk center is given a light second coat of the boron$^{10}$ suspension, and the unit is then baked again as above. This procedure of alternate coating and baking is repeated until a deposit of boron$^{10}$ of slightly more than desired thickness is obtained on the mica disk. After the final baking, the top surface of the deposited portion of boron$^{10}$ is scraped with a razor blade, supported parallel to the mica disk on a suitable fixture, until the resulting disk of boron$^{10}$ has the desired thickness.

Next, the diameter of the boron$^{10}$ disk is reduced to a uniform dimension of 0.125 inch by the use of the aforementioned abrasive air gun and a 0.125 inch solid rubber mask placed exactly in the center of the boron$^{10}$ disk. The result is a neutron sensitive disk of desired, uniform dimensions and desired weight securely attached to the face of the mica disk at the center thereof. Finally, the unit is thoroughly cleaned of all abrasive particles, superfluous boron[10], and all other foreign material by means of a suitable solvent cleaner, such as acetone or carbontetrachloride, applied with a lintless paper. This procedure also removes any traces of the oil ring which have not already been removed by the air gun.

Figure 9:
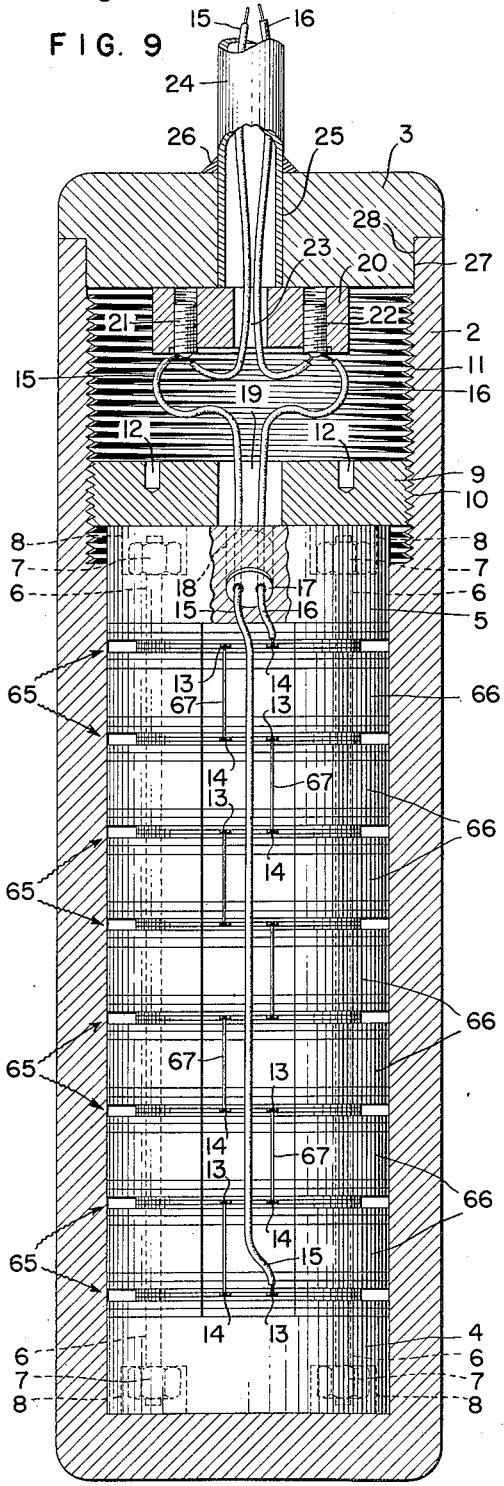
Fig. 9 is a view, shown partly in section, of a multiple detecting portion form of the detector of Fig. 1.
Figure 10:
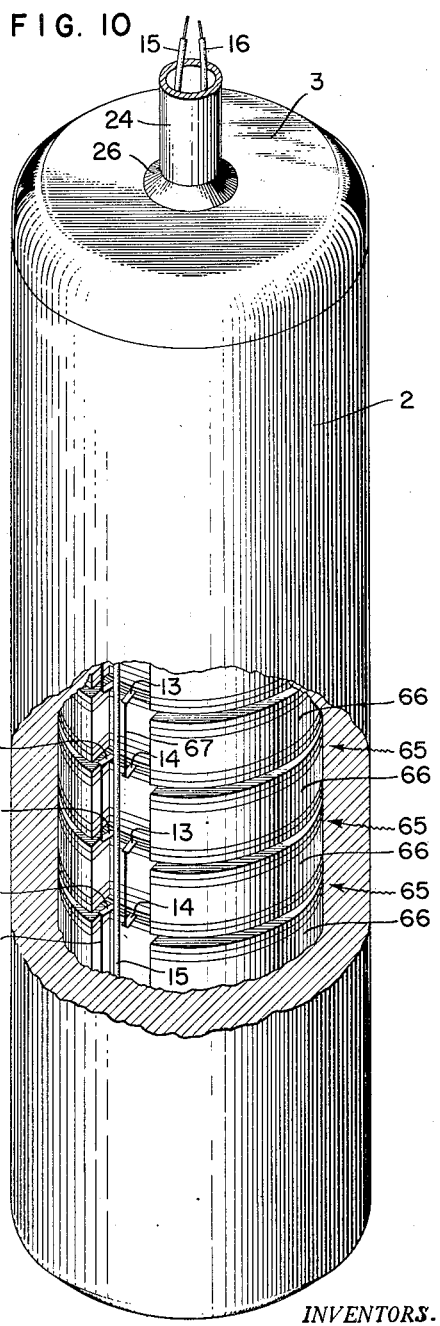
Fig. 10 is a view, shown partly cut away, of the multiple form of detector shown in Fig. 9.

*The apparatus of Figs. 9 and 10*

For those applications of the detector of the present invention in which a higher detector sensitivity is required, for a given response speed, than can be obtained with the single detecting portion detector of Fig. 1, it may be desirable to utilize a multiple form of the Fig. 1 detector including a plurality of detecting portions. Such a multiple detector is shown in Fig. 9, wherein there is illustrated a detector having a structure which is identical to that of the Fig. 1 detector except for the inclusion of eight detecting portions, and except for the lengthening of the housing 2 and the guide rods 6 as necessary to accommodate the additional detecting portions. For illustrative purposes, the detecting portions of the Fig. 9 detector have been indicated as being of the form of the preferred arrangement 65 of Fig. 8, but it is noted that detecting portions of the types shown in Figs. 2, 5, and 6 can be employed in the Fig. 9 detector in lieu of the portions 65 if conditions make it desirable to do so.

The number of detecting portions to be used in a multiple form of detector under any given set of conditions depends upon the factors involved in the particular situation, and the use of eight detecting portions in the detector of Fig. 9 has been chosen merely for illustrative purposes. It is noted, however, that a detector having eight detecting portions constructed as described and illustrated herein has been found to be highly satisfactory in practice for providing measurements of the neutron flux existing in a neutronic reactor.

It can be seen by inspection that the upper section of the Fig. 9 detector is identical to the corresponding section of the detector of Fig. 1. Accordingly, an additional description of this section of the Fig. 9 detector need be presented herein. Therefore, in describing the Fig. 9 detector it is sufficient to start at the plug 9 and work downward. Doing this, it is noted that the detector of Fig. 9 includes within the housing 2, and below the plug 9, the top end plate 5, a first detecting portion 65, a first spacer member 66, a second detecting portion 65, a second spaced 66, a third detecting portion 65, and so on down to the eighth detecting portion 65 at the lower end of the housing. The stacked assembly of the eight detecting portions 65 and the intervening spacers 66 terminates at its lower end with the bottom end plate 4, and is held together in a compact, unitary assembly by the guide rods 6 as in the case of the Fig. 1 detector. Therefore, the stacked assembly of the Fig. 9 detector with its eight detecting portions is adapted to be made up and inserted in the housing 2 in the same manner as described in connection with the Fig. 1 detector, and is adapted to be firmly held in the lower portion of the housing 2 by means of the plug 9 as before.

The output terminals of the eight thermopiles 29″ of the detecting portions 65 of the Fig. 9 detector are connected by conductors 67 in a series circuit between the detector output leads or conductors 15 and 16 in such a manner that the electrical output of the detector is the algebraic sum of the individual output voltages of the thermopiles. To this end, the output lead 16 is connected to the output terminal 14 of the first or top one of the thermopiles 29″, and the output terminal 13 of the latter is connected by one of the conductors 67 to the output terminal 14 of the second or next lower one of the thermopiles 29″. In order to permit the conductors 67 to run parallel to the channel space formed in the stacked assembly by the notches provided in the various members, every other thermopile is alternated or turned over so as to put the output terminals 13 first on the left and then on the right and so on down the assembly as shown in Fig. 9. By virtue of this arrangement, the terminal 14 of the second thermopile lies directly below the terminal 13 of the first thermopile, and the connecting conductor 67 can thus bridge these two terminals in a direct and convenient manner.

Similarly, the procedure just described results in the location of the terminal 13 of the second thermopile directly above the terminal 14 of the third thermopile, whereby these terminals are conveniently connected together by another of the vertically disposed conductors 67. This procedure is followed throughout the remainder of the stacked assembly as shown, and the remaining terminal 13 of the eighth and last thermopile is connected to the remaining output lead 15 to complete the series circuit. Since all of the thermopile terminals 13 are assumed to be of the same polarity, while all of the terminals 14 are assumed to be of the opposite polarity, the construction just described results in the connection of all of the thermopile outputs in series aiding relationship between the output leads 15 and 16.

The manner in which the thermopile output terminals 13 and 14 are interconnected within the channel provided on the face of the stacked internal detecting assembly of the Fig. 9 detector is shown most clearly in Fig. 10, wherein there is illustrated a somewhat perspective view of the Fig. 9 detector. In Fig. 10, a portion of the detector housing 2 has been shown cut away so as to expose the internal stacked detecting assembly and to show the internal arrangement of the detector and the manner in which the thermopile output terminals are interconnected. The foregoing description of this interconnection of the thermopile should be abundantly clear when considered in connection with the disclosure of Fig. 10.

*Operation of the apparatus of Figs. 9 and 10*

In order to prevent the detecting portions 65 of the Fig. 9 detector from seriously shielding one another from the incident neutron flux, these portions must be suitably spaced from one another within the detector housing 2. The spacers 66 are provided for the purpose of effecting this spacing. The thickness of these spacers is so chosen as to minimize the mutual flux shielding between the detecting portions while keeping the detector as compact as possible. As a result of this construction, the detector of Fig. 9 with its eight detecting portions and eight thermopiles can be made to have a sensitivity which closely approaches a value of eight times the sensitivity of the Fig. 1 detector including a single one of the identical detecting portions. In other words, the proper spacing of the eight detecting portions of the Fig. 9 detector makes it possible to obtain an output, for a given value of incident neutron flux, which is substantially equal to eight times the output which would be obtained from the single form of detector of Fig. 1 using but a single one of the same detecting portions and subjected to the same value of neutron flux.

That the foregoing is of great practical importance becomes apparent when it is noted that the increase in detector sensitivity obtained by employing additional detecting portions as just described is not obtained at the sacrifice of response speed. That is, the multiple detector of Fig. 9 with its eight detecting portions will have the same response speed, for a given flux change, as the Fig. 1 detector with a single one of these detecting portions. This makes it possible to design a single detector portion having a required high response speed, even at the sacrifice of sensitivity, and then to employ as many of such portions as necessary in a multiple form of detector to obtain the required sensitivity while still retaining the high response speed of the single detecting portion.

For example, a detecting portion designed to have a relatively high response speed as required for a given application will inherently have a relatively low sensitivity, which may well be below that required for the particular application, because of the inverse relationship which exists between these two characteristics as explained hereinbefore. This is especially true in those applications which require both a high sensivity and a high response speed. By constructing a detecting portion having the necessarily high response speed, and by employing as many of these portions as necessary to increase the total detector sensitivity to the required value, it is possible to provide a detector of the type shown in Figs. 9 and 10 which will fulfill both the high response speed and high sensitivity requirements of the particular application of this example.

A typical example of the Fig. 9 apparatus

By way of illustration and example, and not by way of limitation, it is noted that the aforementioned detector which has been constructed according to the present invention is of the form illustrated in Fig. 9 and embodies elements and relationships having the characteristics set forth below. As was previously mentioned, this detector has been found to be highly satisfactory in practice for providing measurements of the neutron flux existing in a neutronic reactor. Of necessity, some of the following values are approximate.

DETECTOR IN GENERAL

Housing 2:
    Length _____ 4.438 in.
    External diameter_____ 1.5 in.
    Internal diameter (bottom)_____ 1.129 in.
    Material _____ aluminum (2S).
End plates 4 and 5:
    Diameter _____ 1.125 in.
    Thickness _____ 0.375 in.
    Material _____ aluminum (2S).
Spacers 66:
    Diameter _____ 1.125 in.
    Thickness _____ 0.187 in.
    Material _____ aluminum (2S).
Sensitivity: $1.6 \times 10^{-15}$ volts per unit thermal neutron flux. (Total).
Response speed: Time constant of 0.1 second, i. e., output reaches 63.2% of its final value within 0.1 second after flux change occurs.

EACH OF THE EIGHT DETECTING PORTIONS 65

Spacers 40 and 41:
    Diameter _____ 1.125 in.
    Thickness _____ 0.032 in.
    Hole diameter_____ 0.5 in.
    Material _____ aluminum (2S).
Plates 34 and 35:
    Diameter _____ 1.125 in.
    Thickness _____ 0.032 in.
    Extrusion diameter_____ 0.1562 in.
    Extrusion height_____ 0.005 in.
    Material _____ aluminum (2S).
Disks 56 and 57:
    Diameter _____ 0.875 in.
    Thickness _____ 0.0017 in.
    Material _____ mica.
Disks 59 and 60:
    Diameter _____ 0.125 in.
    Thickness _____ 0.0015 in.
    Weight _____ 0.75 mg.
    Material _____ $boron^{10}$.
Thermopile 29": Diameter_____ 0.875 in.

For a multiple detector of the form illustrated in Fig. 9 but containing detecting portions having different sensitivity and/or response speed characteristics, the actual detector response speed will be the average of the response speeds of the several detecting portions, and any difference in the sensitivities of the individual detecting portions will be averaged out in the over-all detector sensitivity.

Although the differential temperature responsive devices which have been illustrated herein by way of example have all been of the thermopile type, it is noted that other types of differential temperature responsive devices, such, for example, as resistance thermometer devices, can be employed in the detectors of the present invention if desired. Moreover, thermopile-type devices of different shapes than the circular, flat type illustrated by way of example herein may be used in the detectors according to the invention where practical. Also, it may be found desirable in some cases to interconnect the several thermopile outputs of a multiple detector in parallel or in series-parallel relationship so as to increase the reliability of the detector and/or provide a lower output resistance.

The apparatus of Fig. 11

As was described hereinbefore, the sink structure of the detectors of the present invention is characterized by its ability to carry off heat at a relatively high rate. To this end, the sink structure is so constructed in the known manner as to be able to absorb heat from the neutron sensitive portion, and to transmit and lose this heat to the atmosphere, at a sufficiently high rate to prevent the sink structure temperature from varying significantly as a result of the variations which occur in the temperature of the neutron sensitive portion as a result of changes in the incident neutron flux. Thus, the sink structure of the subject detectors is made to have a practically infinite capacity for heat by virtue of its being constructed with the ability to lose heat at a relatively high rate. Also, the sink structure is made to have good thermal conductance characteristics so as to insure equality of temperature throughout the various portions of this structure.

The foregoing construction also prevents the detector output from being adversely affected, in many applications, as a result of relatively slow changes in the ambient temperature to which the detector is exposed. Such changes, if sufficiently slow, cause the temperatures of both the hot and cold junction structures of the thermopile to change at substantially the same rate, with the result that the thermopile and detector output is substantially unaffected by such ambient temperature changes.

If a change occurs in the ambient temperature which is sufficiently large and rapid to cause the hot and cold junction structure temperatures to change at different rates, the detector output will usually be undesirably affected. Such a condition can occur in the detectors previously described because the hot junction structure of these arrangements is actually thermally insulated somewhat from the sink and cold junction structure by the nature of the construction employed, whereby the sink and cold junction structure temperature can be changed more rapidly by an ambient temperature change than can the hot junction structure temperature.

This sensitivity of the previously described detectors to ambient temperature changes can be virtually eliminated or at least substantially reduced by accompanying each neutron flux detecting portion of the detector with a similar but non-neutron sensitive portion the output of which is connected so as to oppose the output of the neutron flux detecting portion. In the single form of detector of Fig. 1, such ambient temperature compensation can be achieved by adding to the detector a second portion which is like the detecting portion 1, 55, 58, or 65 of the detector but which is modified so as to prevent the thermopile which it includes from responding to neutron flux. In the multiple form of detector of Fig. 9, compensation can be achieved by causing every other one of the thermopiles to be non-responsive to neutron flux. This procedure will result, of course, in a reduction of the sensitivity of a given detector to approximately one-half of its former value, but the original detector sensitivity can be restored in such a case simply by doubling the original number of portions and thermopiles.

In practice, it may be found to be desirable to provide the above-described ambient temperature compensating feature by simply modifying the detecting portion or portions employed in each detector so as to have each of such portions include both a thermopile which is caused to be responsive to neutron flux, and a similar thermopile which is not caused to be so responsive. Such a modified form of detecting portion is illustrated in Fig. 11, wherein there is shown by way of example a modification of the detecting portion 65 of Fig. 8.

The arrangement of Fig. 11 includes all of the components of the detecting portion 65 of Fig. 8, and additionally includes the necessary members to add a second, non-neutron responsive thermopile section to the arrangement which is sufficiently identical to the neutron responsive section so as to be effective in providing the above-described ambient temperature compensation. Thus, the Fig. 11 arrangement includes in its neutron responsive section 68 the plates 34 and 35 with their respective extrusions 38 and 39, the mica disks 56 and 57 carrying the respective neutron sensitive disks 59 and 60, and the thermopile 29″.

The Fig. 11 arrangement also includes a non-neutron responsive, temperature compensating section 69 which is identical to the neutron responsive section 68 except for the inclusion of disks of non-neutron sensitive material in lieu of the neutron sensitive disks 59 and 60 of the section 68. To this end, the section 69 includes a pair of the plates 34 and 35 with respective extrusions 38 and 39, a pair of the mica disks 56 and 57, and a thermopile 29‴. In lieu of the neutron sensitive disks 59 and 60 of the section 68, the section 69 includes disks 70 and 71 which are formed of a non-neutron sensitive material.

Since the degree with which the desired ambient temperature compensation is obtained depends upon the degree to which the compensating section 69 and all of its structure and components is thermally identical to the neutron responsive section 68 and its structure and components, the various members of each section are made as nearly identical as possible to the corresponding members of the other section. In other words, the structure associated with the junction structure of the compensating thermopile is made as nearly as possible to have the same thermal parameters as the structure associated with the junction structures of the neutron responsive thermopile. To this end, the non-neutron sensitive disks 70 and 71 are advantageously made the counterparts of the neutron sensitive disks 59 and 60, except as to neutron sensitivity. Thus, the disks 70 and 71 are made as nearly as possible to have the same size, shape, and weight as the disks 59 and 60, and are made of a material having thermal characteristics which are as similar as possible to those of the disks 59 and 60. For example, if the latter are formed of boron[10], the disks 70 and 71 are advantageously formed of boron[11], this material being non-neutron sensitive but sufficiently thermally similar to the boron[10] for the present purposes.

In the arrangement of Fig. 11, the two sections 68 and 69 are axially stacked as shown, the plate 35 of the section 68 being separated from the plate 34 of the section 69 by one of the spacers 40 with its central aperture 42. Spacers 40 and 41 are also present at the top and bottom of the Fig. 11 stack, respectively, as in the arrangements of Figs. 2, 5, 6, and 8. However, these spacers are not shown in Fig. 11 because of space limitations.

As shown in Fig. 11, the outputs of the two thermopiles 29″ are connected in series voltage opposition between the output leads 15 and 16. Specifically, the terminal 14 of the responsive section thermopile is connected by a conductor 72 to the terminal 14 of the same polarity of the compensating section thermopile. The remaining terminals 13 of the two thermopiles are respectively connected to the output leads 15 and 16, thereby completing the series circuit through the two thermopiles.

*Operation of the Fig. 11 apparatus*

By virtue of the construction just described, and assuming thermal identity between the sections 68 and 69, the ambient temperature compensated detecting portion of Fig. 11 is operative to provide an output voltage which is a function of solely neutron flux, and which is substantially unaffected by ambient temperature changes which would cause the detecting portions of Figs. 2, 5, 6, and 8 to produce spurious output voltages. It has been found, for example, that the use of the construction shown in Fig. 11 can effectively reduce the magnitude of such spurious output voltages of the uncompensated forms of Figs. 2, 5, 6, and 8 by a factor of at least ten. The manner in which this compensating action is effected will now be described.

The occurrence of a relatively large and rapid change in the ambient temperature to which the detector including the detecting portion of Fig. 11 is exposed causes the temperature of the sink and of the two thermopile cold junction structures to change at a rate which is different from that at which the temperatures of the two thermopile hot junction structures are caused to change, due to the aforementioned fact that the hot junction structures are thermally insulated somewhat from the sink and cold junction structures. However, the temperatures of the two hot junction structures are caused to change at the same rate, as a result of said ambient temperature change, assuming that the neutron responsive and compensating sections are substantially thermally identical. Also, under the same assumption, the two cold junction structures have equal temperatures which change at the same rate as a result of said ambient temperature change. Therefore, the change in the output voltage of one of the thermopiles, resulting from the change in the difference between its hot and cold junction temperatures as a result of said ambient temperature change, is substantially equal to the change in the output voltage of the other of the thermopiles resulting from the change in the difference between its hot and cold junction temperatures as a result of said ambient temperature change. As a result, there is substantially no change produced in the detector output voltage by said ambient temperature change, since the two equal thermopile output voltage changes act in opposition and effectively cancel each other, due to the series opposition connection of the thermopile outputs.

It is apparent from the foregoing that the arrangement of Fig. 11 substantially eliminates the transient measuring errors which would otherwise be produced by ambient temperature changes which cause the thermopile cold junction structure temperature to precede the hot junction structure temperature in changing to the new values corresponding to the new value of ambient temperature.

It is noted that the foregoing operation takes place notwithstanding the fact that the two hot junction structures are at different temperatures due to the presence of a neutron flux. It is also noted that the response of the detector to neutron flux is not affected by the presence of the second, compensating thermopile, since the temperature difference between the hot and cold junctions of the latter is not affected by neutrons.

The foregoing operation can be explained also by noting that the output voltage of the Fig. 11 arrangement is actually proportional to the difference between the temperatures of the two thermopile hot junction structures, since the two cold junction structures are assumed to be equal. Therefore, under ideal conditions, the detector output is not changed by an ambient temperature change, since the latter does not change the difference between the temperatures of the two hot junction structures established by the incident neutron flux. However, a change in the value of the latter does produce a change in the detector output, since the temperature of the hot junction structure of the neutron responsive section thermopile is changed by such a flux change, while the latter does not affect the temperature of the hot junction structure of the non-neutron sensitive section thermopile.

Although the foregoing description has been directed to a single form of detector employing a single one of the portions of Fig. 11, it is noted that this description applies as well to a multiple form of detector employing a plurality of the Fig. 11 portions connected in series.

While, in accordance with the provisions of the statutes, we have illustrated and described the best forms of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described our invention, what we claim as new and desire to secure by Letters Patent is as follows:

1. A neutron flux responsive detector comprising a neutron sensitive portion composed at least in part of a neutron sensitive material which is characterized by a relatively good neutron capturing ability and which is operative, when subjected to neutrons, to generate heat in said portion at a rate which is dependent upon the incident neutron flux, structure constituting a thermal sink relative to said portion and characterized by an ability to carry off heat at a relatively high rate, said structure being formed of a material having good thermal conduction characteristics to provide substantial equality of temperature throughout said structure and being characterized also by a relatively poor neutron capturing ability, a solid thermal connection of relatively good thermal conductance arranged between said neutron sensitive portion and said structure and operative to maintain said portion in good heat transfer relationship with said structure and to cause the heat generated in said portion to flow from the latter to said structure over a solid thermal conduction path through said connection at a rate dependent upon the rate at which said generation of heat takes place, whereby there is developed across said path and between said portion and said structure a temperature difference of a magnitude which is dependent upon said rate of flow of heat, and a differential temperature responsive device having a first temperature responsive element arranged in good heat transfer relationship with said neutron sensitive portion, having a second temperature responsive element arranged in good heat transfer relationship with said structure, and having an output portion in which said device is adapted to produce an electrical effect which is dependent upon the difference between the temperatures of said elements and hence upon said incident neutron flux, said thermal connection and thermal conduction path being independent of said temperature responsive device.

2. Apparatus as specified in claim 1, wherein said neutron sensitive portion is in the form of a coating of said neutron sensitive material on said first temperature responsive element, wherein the inner surface of said coating is arranged in direct contact and in good heat transfer relationship with said first temperature responsive element, and wherein there are included securing means which are arranged to maintain at least a part of the exterior surface of said coating in good heat transfer relationship with said sink structure.

3. Apparatus as specified in claim 2, wherein said sink structure includes at least one member which is adapted to be in direct contact with at least a part of said exterior surface of said neutron sensitive coating, and wherein said securing means are arranged to maintain said sink structure member firmly in direct contact and in good heat transfer relationship with said exterior surface of said coating to establish said solid thermal connection between said neutron sensitive portion and said sink structure which is independent of said temperature responsive device.

4. Apparatus as specified in claim 2, wherein there is included a solid, electrical insulating member having relatively good thermal conductance and adapted to be included in said solid thermal connection between said neutron sensitive portion and said sink structure, wherein said sink structure includes at least one member which is adapted to be in contact through said insulating member with at least a part of the exterior surface of said neutron sensitive coating, and wherein said securing means are arranged to maintain said sink structure member in contact and in good heat transfer relationship with said exterior surface of said coating through said insulating member, said securing means including parts arranged to maintain said sink structure member firmly in direct contact and in good heat transfer relationship with said insulating member and to maintain the latter, in turn, firmly in direct contact and in good heat transfer relationship with said exterior surface of said coating, thereby to establish said solid thermal connection between said neutron sensitive portion and said sink structure which is independent of said temperature responsive device.

5. Apparatus as specified in claim 1, wherein said neutron sensitive portion is in the form of at least one discrete member formed of said neutron sensitive material, and wherein there are included securing means which are arranged to maintain one surface of said neutron sensitive member in good heat transfer relationship with said first temperature responsive element, and to maintain a second surface of said neutron sensitive member in good heat transfer relationship with said sink structure.

6. Apparatus as specified in claim 5, wherein said sink structure includes at least one member which is adapted to be in direct contact with said second surface of said neutron sensitive member, and wherein said securing means are arranged to maintain said one surface of said neutron sensitive member firmly in direct contact with said first temperature sensitive element, and to maintain said sink structure member firmly in direct contact and in good heat transfer relationship with said second surface of said neutron sensitive member to establish said solid thermal connection between said neutron sensitive portion and said sink structure which is independent of said temperature responsive device.

7. Apparatus as specified in claim 5, wherein there is included a solid, electrical insulating member having relatively good thermal conductance and adapted to be included in said solid thermal connection between said neutron sensitive portion and said sink structure, wherein said sink structure includes at least one member which is adapted to be in contact through said insulating member with said second surface of said neutron sensitive member, wherein said securing means are arranged to maintain said one surface of said neutron sensitive member firmly in direct contact with said first temperature sensitive element, and wherein said securing means are also arranged to maintain said sink structure member in contact and in good heat transfer relationship with said second surface of said neutron sensitive member through said insulating member, said securing means including parts arranged to maintain said sink structure member firmly in direct contact and in good heat transfer relationship with said insulating member and to maintain the latter, in turn, firmly in direct contact and in good heat transfer relationship with said second surface of said neutron sensitive member, thereby to establish said solid thermal connection between said neutron sensitive portion and said sink structure which is independent of said temperature responsive device.

8. Apparatus as specified in claim 1, wherein said differential temperature responsive device is a thermoelectric device having a hot junction structure and a cold junction structure and adapted to produce in said output portion an e. m. f. which is dependent in magnitude upon the difference between the temperatures of said two junction structures, and wherein said first and said second temperature responsive elements are said hot and said cold junction structures, respectively.

9. Apparatus as specified in claim 8, wherein said thermoelectric device is a thermopile having a hot junction structure including a plurality of thermocouple hot junctions disposed closely together in a circular configuration, having a cold junction structure including a plurality of thermocouple cold junctions arranged in a circular configuration, and having first and second output terminals constituting said output portion and between which all of said junctions are electrically connected in series, and wherein there are included securing means which are arranged to maintain said cold junctions in firm contact and in good heat transfer relationship with said sink structure.

10. Apparatus as specified in claim 9, wherein said neutron sensitive portion is in the form of a coating of said neutron sensitive material on said hot junctions, wherein the inner surface of said coating is arranged in direct contact and in good heat transfer relationship with said hot junctions, and wherein said securing means are arranged to maintain at least a part of the exterior surface of said coating in good heat transfer relationship with said sink structure.

11. Apparatus as specified in claim 10, including housing structure for said thermopile constituting at least a portion of said sink structure, and including a stacked detecting portion assembly adapted to be secured within said housing structure, said assembly including said thermopile and first and second sink structure plates having relatively high thermal conductance and disposed on opposite sides of said thermopile, said securing means being arranged to maintain said plates and said thermopile stacked in firm contact in said assembly, to maintain at least a portion of each of said plates firmly in direct contact and in good heat transfer relationship with said exterior surface of said coating, and to maintain said plates in firm contact and in good heat transfer relationship with said cold junctions and with said housing structure, thereby to establish said solid thermal connection between said neutron sensitive portion and said sink structure which is independent of said thermopile.

12. Apparatus as specified in claim 10, including housing structure for said thermopile constituting at least a portion of said sink structure, and including a stacked detecting portion assembly adapted to be secured within said housing structure, said assembly including said thermopile, first and second solid, electrical insulating plates disposed on opposite sides of said thermopile and having relatively good thermal conductance, and first and second sink structure plates disposed on opposite sides of the sub-assembly of said thermopile and said insulating plates and having relatively higher thermal conductance than said insulating plates, said securing means being arranged to maintain said plates and said thermopile stacked in firm contact in said assembly, to maintain at least a portion of each of said sink structure plates firmly in contact and in good heat transfer relationship with said exterior surface of said coating through a respective one of said insulating plates, and to maintain said sink structure plates in firm contact and in good heat transfer relationship with said cold junctions and with said housing structure, thereby to establish said solid thermal connection between said neutron sensitive portion and said sink structure which is independent of said thermopile.

13. Apparatus as specified in claim 9, wherein said neutron sensitive portion is in the form of first and second discrete, disk-like members formed of said neutron sensitive material, and wherein said securing means are arranged to maintain one surface of each of said neutron sensitive members in good heat transfer relationship with said hot junctions, and to maintain a second surface of each of said neutron sensitive members in good heat transfer relationship with said sink structure.

14. Apparatus as specified in claim 13, including housing structure for said thermopile constituting at least a portion of said sink structure, and including a stacked detecting portion assembly adapted to be secured within said housing structure, said assembly including said thermopile, said neutron sensitive members, and first and second sink structure plates having relatively high thermal conductance and adapted to carry said neutron sensitive members on opposite sides of said thermopile, said securing means being arranged to secure said second surface of each of said neutron sensitive members in direct contact and in good heat transfer relationship to a surface of a respective one of said plates, to maintain said plates and said thermopile stacked in firm contact in said assembly, to maintain said one surface of each of said neutron sensitive members in direct contact with said hot junctions, and to maintain said plates in firm contact and in good heat transfer relationship with said cold junctions and with said housing structure, thereby to establish said solid thermal connection between said neutron sensitive portion and said sink structure which is independent of said thermopile.

15. Apparatus as specified in claim 13, including housing structure for said thermopile constituting at least a portion of said sink structure, and including a stacked detecting portion assembly adapted to be secured within said housing structure, said assembly including said thermopile, said neutron sensitive members, first and second solid, electrical insulating plates having relatively good thermal conductance and adapted to carry said neutron sensitive members on opposite sides of said thermopile, and first and second sink structure plates disposed on opposite sides of the sub-assembly of said thermopile, said neutron sensitive members, and said insulating plates and having relatively higher thermal conductance than said insulating plates, said securing means being arranged to secure said second surface of each of said neutron sensitive members in direct contact and in good heat transfer relationship to a surface of a respective one of said insulating plates, to maintain said plates and said thermopile stacked in firm contact in said assembly, to maintain said one surface of each of said neutron sensitive members in direct contact with said hot junctions, to maintain at least a portion of each of said sink structure plates firmly in contact and in good heat transfer relationship with said second surface of the respective one of said neutron sensitive members through the respective one of said insulating plates, and to maintain said sink structure plates in firm contact and in good heat transfer relationship with said cold junctions and with said housing structure, thereby to establish said solid thermal connection between said neutron sensitive portion and said sink structure which is independent of said thermopile.

16. Apparatus as specified in claim 15, wherein there is included a stacked multiple assembly adapted to be secured within said housing structure and including said stacked detecting portion assembly, said apparatus also including additional ones of said detecting portion assemblies included in said multiple assembly and stacked therein in end-to-end relationship, a separate spacing member of good thermal conduction characteristics included between each adjacent pair of said detecting portion assemblies in said multiple assembly and arranged to space each of said detecting portion assemblies from the adjacent ones of these assemblies by an amount which is sufficient to prevent each of these assemblies from being significantly shielded from said incident neutron flux by the others of these assemblies, said detecting portion assemblies and said spacing members being firmly stacked together in good heat transfer relationship in said multiple assembly and being arranged in good heat transfer relationship with said housing structure, a pair of electrical output conductors, and electrical conductor means arranged to connect the output terminals of the thermopiles included in said detecting portion assemblies in series aiding relationship between said output conductors.

17. Apparatus as specified in claim 1, wherein said sink structure includes at least one member which is adapted to be in direct contact with one surface of said neutron sensitive portion, wherein there are included securing means which are arranged to maintain said sink structure member firmly in direct contact and in good heat transfer relationship with said one surface of said portion and to maintain said sink structure member firmly in direct contact and in good heat transfer relationship with the remainder of said sink structure, thereby to establish said solid thermal connection between said portion and said structure which is independent of said temperature responsive device, and wherein said securing means are arranged to maintain a second surface of said neutron sensitive portion firmly in direct contact and in good heat transfer relationship with said first temperature responsive element and to maintain said sink structure member in firm contact and in good heat transfer relationship with said second temperature responsive element.

18. Apparatus as specified in claim 1, wherein there is included a solid, electrical insulating member having relatively good thermal conductance and adapted to be included in said solid thermal connection between said neutron sensitive portion and said sink structure, wherein said sink structure includes at least one member which is adapted to be in contact through said insulating member with one surface of said neutron sensitive portion, wherein there are included securing means which are arranged to maintain said sink structure member in firm contact and in good heat transfer relationship with said one surface of said portion through said insulating member and to maintain said sink structure member firmly in direct contact and in good heat transfer relationship with the remainder of said sink structure, thereby to establish said solid thermal connection between said portion and said structure which is independent of said temperature responsive device, and wherein said securing means are arranged to maintain a second surface of said neutron sensitive portion firmly in direct contact and in good heat transfer relationship with said first temperature responsive element and to maintain said sink structure member in firm contact and in good heat transfer relationship with said second temperature responsive element.

19. A neutron flux responsive detector including housing structure constituting at least a part of thermal sink structure included in said detector and characterized by an ability to carry off heat at a relatively high rate, said structure being formed of a material having good thermal conduction characteristics to provide substantial equality of temperature throughout said structure and being characterized also by a relatively poor neutron capturing ability, a stacked detecting portion assembly adapted to be secured within said housing structure and including a neutron sensitive portion composed at least in part of a neutron sensitive material which is characterized by a relatively good neutron capturing ability and which is operative, when subjected to neutrons, to generate heat in said portion at a rate which is dependent upon the incident neutron flux, said assembly also including a differential temperature responsive device and first and second sink structure plates adapted to be disposed on opposite sides of said device and having relatively good thermal conductance, said device having first and second temperature responsive elements and having an output portion in which said device is adapted to produce an electrical effect which is dependent upon the difference between the temperatures of said elements, and securing means arranged to maintain said plates and said device stacked in firm contact in said assembly, to maintain said neutron sensitive portion between and in good heat transfer relationship with said plates and said first temperature responsive element, and to maintain said plates in good heat transfer relationship with the remainder of said sink structure to establish a solid thermal connection of relatively good thermal conductance between said neutron sensitive portion and said sink structure which is independent of said temperature responsive device and which is operative to maintain said portion in good heat transfer relationship with said structure and to cause the heat generated in said portion to flow from the latter to said structure over a solid thermal conduction path through said connection at a rate dependent upon the rate at which said generation of heat takes place, whereby there is developed across said path and between said portion and said structure a temperature difference of a magnitude which is dependent upon said rate of flow of heat, said securing means being arranged to maintain said second temperature responsive element in good heat transfer relationship with said plates and the remainder of said structure to cause said device to produce in said output portion an electrical effect which is dependtnt upon the difference between the temperatures of said portion and structure and hence upon said incident neutron flux.

20. Apparatus as specified in claim 19, wherein there is included a stacked multiple assembly adapted to be secured within said housing structure and including said stacked detecting portion assembly, said apparatus also including additional ones of said detecting portion assemblies included in said multiple assembly and stacked therein in end-to-end relationship, a separate spacing member of good thermal conduction characteristics included between each adjacent pair of said detecting portion assemblies in said multiple assembly and arranged to space each of said detecting portion assemblies from the adjacent ones of these assemblies by an amount which is sufficient to prevent each of these assemblies from being significantly shielded from said incident neutron flux by the others of these assemblies, said detecting portion assemblies and said spacing members being firmly stacked together in good heat transfer relationship in said multiple assembly and being arranged in good heat transfer relationship with said housing structure, a pair of electrical output conductors, and electrical conductor means arranged to connect the output portions of the differential temperature responsive devices included in said detecting portion assemblies in series aiding relationship between said output conductors.

21. Apparatus as specified in claim 19, including a second, stacked, ambient temperature compensation assembly adapted to be secured within said housing structure in close proximity to and in good heat transfer relationship with said detecting portion assembly, said second assembly including a non-neutron sensitive portion formed of a material which is characterized by a relatively poor neutron capturing ability, a second differential temperature responsive device, and third and fourth sink structure plates adapted to be disposed on opposite sides of said second device and having relatively good thermal conductance, said second device being substantially thermally identical to the first mentioned device and having third and fourth temperature responsive elements and an output portion in which said second device is adapted to produce an electrical effect which is dependent upon the difference between the temperatures of said third and fourth elements, said third and fourth plates and said second device being stacked in firm contact in said second assembly with said non-neutron sensitive portion between and in good heat transfer relationship with said plates and said third temperature responsive element, said third and fourth plates also being maintained in good heat transfer relationship with said sink structure and with said fourth temperature responsive element and maintaining the latter in good heat transfer relationship with said structure, a pair of electrical output conductors, and electrical conductor means arranged to connect the output portions of said devices in series opposition between said output conductors, the thermal parameters associated with said third and fourth elements being substantially the equivalent of the thermal parameters associated with said first and second elements, thereby to cause the electrical output effect produced between said output conductors to be substantially solely dependent upon said incident neutron flux, and to be substantially independent of temperature differences produced between said elements by ambient temperature changes.

22. A neutron flux responsive detector comprising a neutron sensitive portion composed at least in part of a neutron sensitive material which is characterized by a relatively good neutron capturing ability and which is operative, when subjected to neutrons, to generate heat in said portion at a rate which is dependent upon the incident neutron flux, structure constituting a thermal sink relative to said portion and characterized by an ability to carry off heat at a relatively high rate, said structure being formed of a material having good thermal conduction characteristics to provide substantial equality of temperature throughout said structure and being characterized also by a relatively poor neutron capturing ability, a differential temperature responsive device having first and second temperature responsive elements and an output portion in which said device is adapted to produce an electrical effect which is dependent upon the difference between the temperatures of said elements, a thermal coupling member independent of said temperature responsive device, composed of a solid electrical insulating material, and mounted in good heat transfer relationship between said portion and said structure, said coupling member being characterized by a relatively poor neutron capturing ability and forming a solid thermal connection of relatively good thermal conductance between said portion and structure which is independent of said device and which is operative to maintain said portion in good heat transfer relationship with said structure and to cause the heat generated in said portion to flow from the latter to said structure over a solid thermal conduction path through said coupling member and connection at a rate dependent upon the rate at which said generation of heat takes place, whereby there is developed across said path and between said portion and said structure a temperature difference of a magnitude which is dependent upon said rate of flow of heat and hence upon said rate of heat generation, and means arranged to maintain said first temperature responsive element in thermal contact and in good heat transfer relationship with said portion adjacent one end of said path, and to maintain said second temperature responsive element in thermal contact and in good heat transfer relationship with said structure adjacent the other end of said path, whereby said electrical output effect is dependent upon said incident neutron flux.

23. Apparatus as specified in claim 22, wherein said neutron sensitive portion comprises at least one discrete neutron sensitive member arranged to be carried and supported by said thermal coupling member and having one surface rigidly attached to and in good heat transfer relationship with said coupling member, and wherein the latter is arranged to maintain another surface of said neutron sensitive member in firm contact and in good heat transfer relationship with said first temperature responsive element.

24. The method of producing a neutron sensitive disk member of predetermined dimensions and of uniform shape and surface secured to the surface of a plate member, comprising the steps of roughening an area of said plate surface, depositing a thin ring of grease on said roughened surface area, filling the space enclosed by said ring with a suspension of neutron sensitive material so as to coat the area enclosed by said ring with a thin coating of said suspension, baking the resulting coated plate in an evacuated space to evaporate off said ring and the solvent of said suspension and to cause said neutron sensitive material to form a disk-like coating adhering to said plate, increasing the thickness of said coating by alternately applying additional amounts of said suspension and repeating said baking step, scraping the face of the resulting disk of neutron sensitive material parallel with said surface of said plate to reduce the thickness of said disk to the desired value and to make uniform the surface of said face, masking an area of said face having a diameter equal to the desired disk diameter, and abrading the edge and face of said disk surrounding said masked area to reduce the diameter of said disk to the desired value and to make uniform the surface of said edge.

References Cited in the file of this patent

UNITED STATES PATENTS

| | | |
|---|---|---|
| 1,664,034 | Huseman et al. | Mar. 27, 1928 |
| 2,498,485 | Clawson | Feb. 21, 1950 |
| 2,677,772 | Moon | May 4, 1954 |